United States Patent
Fujii

(10) Patent No.: US 8,311,587 B2
(45) Date of Patent: Nov. 13, 2012

(54) COMMUNICATION TERMINAL

(75) Inventor: Katsushige Fujii, Osaka (JP)

(73) Assignee: KYOCERA Corporation, Kyoto (JP)

( * ) Notice: Subject to any disclaimer, the term of this patent is extended or adjusted under 35 U.S.C. 154(b) by 151 days.

(21) Appl. No.: 12/671,120

(22) PCT Filed: Jul. 28, 2008

(86) PCT No.: PCT/JP2008/063927
§ 371 (c)(1),
(2), (4) Date: Mar. 2, 2010

(87) PCT Pub. No.: WO2009/017237
PCT Pub. Date: Feb. 5, 2009

(65) Prior Publication Data
US 2010/0190537 A1 Jul. 29, 2010

(30) Foreign Application Priority Data
Jul. 30, 2007 (JP) .................... 2007-197013

(51) Int. Cl.
*H04M 1/00* (2006.01)
(52) U.S. Cl. ............ 455/566; 455/347; 455/575.1
(58) Field of Classification Search .......... 455/566, 455/556.2, 347–349, 550.1, 575.1, 575.4, 455/575.8, 90.3; 361/679.04–679.06, 679.21, 361/747, 769, 679.27, 679.29, 616, 667, 361/724–727; 429/97, 100; 439/500
See application file for complete search history.

(56) References Cited

U.S. PATENT DOCUMENTS

| | | | |
|---|---|---|---|
| 6,490,465 B1* | 12/2002 | Mittelstadt et al. .......... 455/566 |
| 7,269,393 B2* | 9/2007 | Ota et al. .................. 455/90.3 |
| 2003/0186728 A1* | 10/2003 | Manjo ................... 455/575.7 |
| 2004/0051676 A1* | 3/2004 | Travis et al. ............... 343/760 |
| 2004/0092297 A1* | 5/2004 | Huang .................. 455/575.7 |
| 2005/0107141 A1* | 5/2005 | Sawada ................. 455/575.3 |
| 2006/0088277 A1* | 4/2006 | Lee ............................ 386/46 |
| 2006/0158534 A1* | 7/2006 | Gotohda ................... 348/239 |
| 2006/0269100 A1* | 11/2006 | Saito et al. ................ 382/100 |
| 2007/0080809 A1* | 4/2007 | Lannon et al. ........... 340/572.7 |
| 2008/0091520 A1* | 4/2008 | Hatori et al. ............... 705/11 |
| 2010/0021176 A1* | 1/2010 | Holcombe et al. ......... 398/115 |

FOREIGN PATENT DOCUMENTS

| | | |
|---|---|---|
| JP | 11-184993 | 7/1999 |
| JP | 2006-157801 | 6/2006 |
| JP | 2006-310911 | 11/2006 |

OTHER PUBLICATIONS

Sanyo, W51SA instruction manual, Feb. 9, 2007, pp. 274-278.

* cited by examiner

*Primary Examiner* — Dominic E Rego
(74) *Attorney, Agent, or Firm* — Procopio, Cory, Hargreaves & Savitch LLP

(57) ABSTRACT

Each of the cases C1 and C2 is formed in a plate. A sliding mechanism SL1 is slidably coupled with the case C1 and the case C2. A Felica circuit 24 is provided with an antenna (24*a*), and is contained in the case C2. A magnetic sensor 28 is contained in the case C2. A magnet 30 is contained in the case C1. A main LCD monitor 32 is attached to a top surface of the case C1. A CPU (22) determines whether an open position or a closed position from the output value of the magnetic sensor 28. In the closed position, an assist mark (36) is displayed on the main LCD monitor 32 at a position of the antenna (24*a*) with respect to the main LCD monitor 32.

11 Claims, 18 Drawing Sheets

FIG. 3
(A)
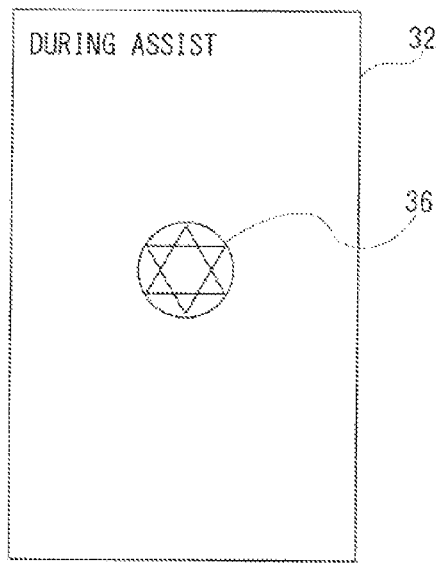
(B)
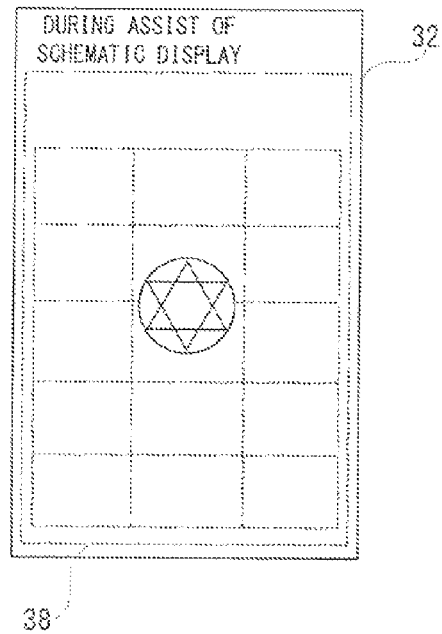
(C)
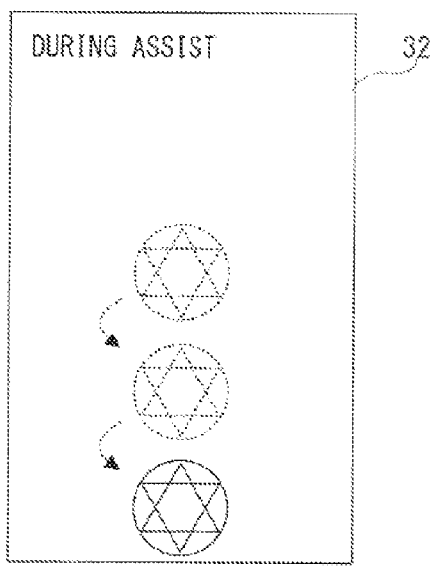

COMMUNICATION TERMINAL

CROSS REFERENCE TO RELATED APPLICATIONS

This application is the U.S. National Stage application of PCT application PCT/JP2008/063927 filed on Jul. 28, 2008, which claims priority under 35 U.S.C. §119 to Japanese Patent Application No. 2007-197013 filed on Jul. 30, 2007, and the contents of each of these applications are incorporated herein by reference in their entirety.

FIELD OF THE INVENTION

The present invention relates to a communication terminal. More specifically, the present invention relates to a communication terminal which performs communications by utilizing an antenna for Near Field Communication.

BACKGROUND

One example of an apparatus of such a kind is disclosed in an instruction manual of W51SA by SANYO on page 274-278 opened on Feb. 9, 2007 (non-patent document 1), for example. According to the prior art, a communication terminal containing a mobile FeliCa chip configured on the basis of a technique of a contactless IC card called "FeliCa" (registered trademark) has been spread. The mobile FeliCa chip is provided with an antenna for making Near Field communication with a reader/writer. The antenna is contained in the communication terminal such that good receiving sensitivity can be retained on one main surface of the communication terminal. Furthermore, when Near Field communication are made between the mobile FeliCa chip contained in the communication terminal and the reader/writer, the antenna for performing the Near Field communication and the reader/writer have to be made close to each other. Thus, on the one main surface of the mobile terminal, a logo mark representing the position where the antenna is contained is provided.

However, in the prior art, the logo mark representing the position of the antenna is hidden under the communication terminal because the antenna and the reader/writer are made closer to each other. Thus, the user could not clearly perceive the position of the antenna when the mobile FeliCa chip contained in the communication terminal makes Near Field communication with the reader/writer.

SUMMARY OF THE INVENTION

Therefore, it is a primary object of the present invention to provide a novel communication terminal.

Another object of the present invention is to provide a communication terminal capable of clearly perceiving the position of an antenna.

The present invention employs following features in order to solve the above-described problems. It should be noted that reference numerals and the supplements inside the parentheses show one example of a corresponding relationship with the embodiments described later for easy understanding of the present invention, and do not limit the present invention.

A communication terminal according to a first invention comprises a case; a display attached to the case; an antenna for Near Field communication contained in the case; and an auxiliary displayer for subsidiarily displaying a position of the antenna on the display.

In a communication terminal (10: reference numeral explaining corresponding part in the embodiment, and the same is applicable hereafter) according to the first invention, a display apparatus (32, 34) is attached to a case (C1, C2). An antenna (24*a*) for Near Field Communication (24) is contained in the case. An auxiliary displayer (S15, S21, S35, S41, S49, S51, S59, S63, S69, S75, S81, S83) subsidiarily displays a position of the antenna on the display.

According to the first invention, the position of the antenna contained in the case is displayed on a display by the auxiliary displayer. Accordingly, the user can clearly perceive the position of the antenna contained in the case, and therefore, it is only necessary to make the communication terminal close to a reader/writer according to the auxiliary displayer.

A communication terminal according to a second invention depends from the first invention, and further comprises a determiner for determining whether or not the position of the antenna is included within a display range of the display, wherein the auxiliary displayer includes a first auxiliary displayer for subsidiarily displaying a first assist mark representing the position of the antenna with respect to the display in a case that the determination result by the determiner is affirmative and a second auxiliary displayer for subsidiarily displaying a second assist mark representing the position of the antenna with respect to the case on the display in a case that the determination result by the determiner is negative.

In a communication terminal according to the second invention, the determiner (S13, S29, S37, S45, S55, S61, S67, S79) determines whether or not the position of the antenna is included within a display range of the display. A first auxiliary displayer (S21, S35, S41, S49, S75, S81) subsidiarily displays a first assist mark (36) representing the position of the antenna with respect to the display in a case that the determination result by the determiner is affirmative. A second auxiliary displayer (S15, S51, S59, S63, S69, S83) subsidiarily displays a second assist mark (36, 38) representing the position of the antenna with respect to the case on the display in a case that the determination result by the determiner is negative.

According to the second invention, the auxiliary displayer switches contents of the auxiliary display about the position of the antenna according to the determination result by the determiner. Accordingly, when the display displays the first assist mark, the first assist mark represents the position of the antenna with respect to the display. Then, it is only necessary for the user to make the position of the antenna close to the reader/writer such that the position of the first assist mark displayed on the display and the reader/writer are superposed with each other.

Furthermore, when the display represents the second assist mark, the second assist mark represents the position of the antenna with respect to the case. Then, it is only necessary for the user to make the position of the antenna close to the reader/writer such that the position of the case represented by the second assist mark and the reader/writer are superposed with each other based on the second assist mark.

A communication terminal according to a third invention depends from the first or the second invention, wherein the case only includes a first case, and the display is attached to one main surface of the first case, and the antenna is contained in the first case.

In the communication terminal according to the third invention, the case only includes the first case (C1), and the display is attached to one main surface of the first case. The antenna is contained in the first case.

According to the third invention, the display is attached to the opposite side of the antenna. Accordingly, the display attached to the one main surface of the first case displays the position of the antenna contained in the first case by the first assist mark or the second assist mark. Thus, the user can clearly perceive the position of the antenna with respect to the first case.

A communication terminal according to a fourth invention depends from the second invention, wherein the case includes the first case and a second case, and further comprises a coupler for coupling the first case and the second case such that a state of the first case with respect to the second case can be shifted, a sensor for detecting a state of the first case with respect to the second case, and a position specifier for specifying a position of the antenna with respect to the case on the basis of an output from the sensor, wherein the determiner performs a determination on the basis of the position specified by the position specifier.

In a communication terminal according to the fourth invention, the case includes the first case and a second case (C2). A coupler (SL, K, H1, H2) couples the first case and the second case such that a state of the first case with respect to the second case can be shifted. A sensor (28, 30) detects a state of the first case with respect to the second case. A position specifier (22) specifies a position of the antenna with respect to the case on the basis of an output from the sensor. The determination result by the determiner performs a determination on the basis of the position specified by the position specifier.

According to the fourth invention, the position of the antenna with respect to the display is specified by the position specifier, so that the determiner outputs the determination result on the basis of the specified position of the antenna. In addition, the auxiliary displayer displays the first assist mark or the second assist mark on the display according to the determination result. Accordingly, even if the state of the first case with respect to the second case shifts by the coupler, the position of the antenna with respect to the display can be specified by the position specifier, so that the display displays the first assist mark or the second assist mark. Thus, the user can clearly perceive the position of the antenna irrespective of the state of the first case with respect to the second case.

A communication terminal according to a fifth invention depends from the fourth invention, wherein the position specifier repeatedly executes position specifying processing, and the first auxiliary displayer moves the first assist mark on the basis of a change of the position specified by the position specifier.

In the communication terminal according to the fifth invention, the position specifier repeatedly executes the position specifying processing. The first auxiliary displayer moves the first assist mark on the basis of a change of the position specified by the position specifier.

According to the fifth invention, the display position of the first assist mark displayed on the display is moved on the basis of the change of the position specified by the position specifier. Accordingly, when the state of the first case with respect to the second case gradually shifts, the position of the first assist mark to be displayed on the display also gradually moves. Thus, the user can clearly perceive the position of the antenna in correspondence with the position of the first assist mark which is gradually moved.

A communication terminal according to a sixth invention depends from the fourth or the fifth invention, wherein the display includes a first display, the first display is attached to the one main surface of the first case, and the antenna is contained in the first case or the second case.

In a communication terminal according to the sixth invention, the first display (32) is included in the display. The first display is attached to the one main surface of the first case. The antenna is contained in the first case or the second case.

A communication terminal according to a seventh invention depends from the sixth invention, wherein the display further includes a second display, and the second display is attached to other main surface of the first case.

In a communication terminal according to the seventh invention, a second display (34) is further included in the display. The second display is attached to the other main surface of the first case.

According to the sixth to seventh inventions, the first display may be attached to the one main surface of the first case, and the antenna may be contained in the first case. Alternatively, the first display may be attached to the one main surface of the first case, and the antenna may be contained in the second case. Still alternatively, the second display may be contained in the other main surface of the first case. Accordingly, even if the antenna is contained in either the first case or the second case, the first display or the second display can show the position of the antenna. Thus, the user can clearly perceive the position of the antenna irrespective of the antenna being contained in the first case or the second case.

A communication terminal according to an eighth invention depends from the seventh invention, further comprises a character string displayer for displaying on the second display a character string to prompt a user to confirm the first display.

In a communication terminal according to the eighth invention, a character string displayer (S33, S53) displays on the second display a character string to prompt a user to confirm the first display.

According to the eighth invention, the second display displays a character string prompting the user to confirm the first display other than the display of the first assist mark or the second assist mark. Accordingly, in a case that the position of the antenna cannot be displayed on the second display, the character string prompting the user to confirm the first display is displayed. Thus, the user can clearly perceive the position of the antenna by confirming the first display.

A communication terminal according to a ninth invention depends from any one of the forth to the eighth inventions, wherein the coupler includes a rotating mechanism of moving the first case with reference to a first axis vertical to a main surface of the second case in a state that the first case is stacked on the second case.

In a communication terminal according to the ninth invention, a rotating mechanism (K) moves the first case with reference to a first axis (AX1) vertical to a main surface of the second case in a state that the first case is stacked on the second case. That is, the rotating mechanism rotates the first case with reference to the first axis.

According to the ninth invention, the first case and the second case are coupled by the rotating mechanism.

A communication terminal according to a tenth invention depends from any one of the fourth to eighth inventions, wherein the coupler includes a sliding mechanism of sliding the first case in a state that the first case is stacked on the second case.

In a communication terminal according to the tenth invention, the sliding mechanism (SL) slides the first case in a state the first case is stacked on the second case.

According to the tenth invention, the first case and the second case are coupled by the sliding mechanism.

A communication terminal according to an eleventh invention depends from any one of the fourth to ninth inventions, wherein the coupler includes a hinge mechanism of moving the first case with reference to a hinge shaft in a state that the first case is stacked on the second case.

In a communication terminal according to the eleventh invention, the hinge mechanism (H1, H2) moves the first case with reference to the hinge shaft (AX2, AX3). That is, the first case and the second case are opened and closed by the rotation with reference to the hinge shaft, and the direction of the face of the first case is reversed.

According to the eleventh invention, the first case and the second case are coupled by the hinge mechanism. In addition, the coupler may simultaneously include the rotating mechanism and the hinge mechanism.

A communication terminal according to a twelfth invention depends from the eleventh invention, wherein the hinge mechanism includes a first hinge mechanism of moving the first case with reference to a first hinge shaft being in parallel with a short side of a main surface of the second case. That is, the first case and the second case are opened and closed by a rotation with reference to the hinge shaft.

In a communication terminal according to the twelfth invention, the first hinge mechanism (H1) moves the first case with reference to a first hinge shaft (AX2) being in parallel with a short side of a main surface of the second case.

A communication terminal according to a thirteenth invention depends from the twelfth invention, wherein the hinge mechanism further includes a second hinge mechanism of reversing a direction of a face of the first case by a rotation with reference to a second hinge shaft being vertical to the first hinge shaft and being in parallel with a long side of the first case.

In a communication terminal according to the thirteenth invention, a second hinge mechanism (H2) reverses a direction of a face of the first case by a rotation with reference to a second hinge shaft (AX3) being vertical to the first hinge shaft and being in parallel with a long side of the first case.

According to the twelfth to thirteenth inventions, the hinge mechanism moves the first case with reference to the first hinge shaft. In addition, the hinge mechanism may reverse the direction of the face of the first case by a rotation with reference to the second hinge shaft.

According to the present invention, the position of the antenna contained in the communication terminal can be clearly perceived, so that it is possible for the mobile FeliCa chip to surely make Near Field communication with the reader/writer.

The above described objects and other objects, features, aspects and advantages of the present invention will become more apparent from the following detailed description of the present invention when taken in conjunction with the accompanying drawings.

BRIEF DESCRIPTION OF THE DRAWINGS

FIG. 3(A) is a display example to be displayed on an LCD monitor, FIG. 3(B) is another display example to be displayed on the LCD monitor, and FIG. 3(C) is a further another display example to be displayed on the LCD monitor.

DETAILED DESCRIPTION

<First Embodiment>

Figure 1:
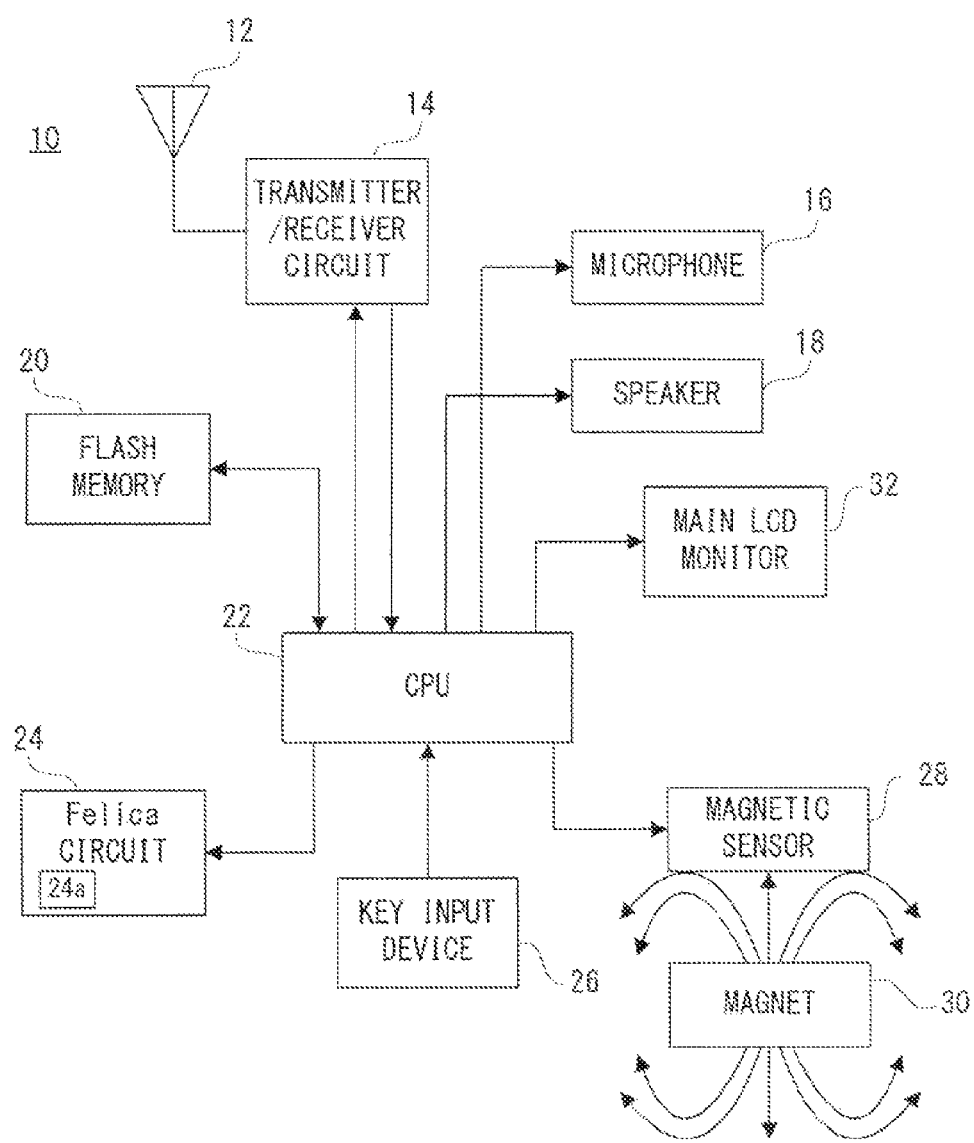
FIG. 1 is a block diagram showing a first embodiment of the present invention.

Referring to FIG. 1, a mobile communication terminal 10 of a first embodiment includes a key input device 26. When a call-out operation is performed with the key input device 26, the CPU 22 controls a transmitter/receiver circuit 14 corresponding to a CDMA system to output a call-out signal. The output call-out signal is emitted from the antenna 12, and sent to a telephone of an intended party through a mobile communication network including base stations. When the intended party performs a call-in operation, a telephone-communication-allowable state is established.

When a conversation end operation is performed with the key input device 26 after shift to the telephone-communication-allowable state, the CPU 22 controls the transmitter/receiver circuit 14 to send a conversation end signal to the intended party. After sending the conversation end signal, the CPU 22 ends the conversation processing. In a case that a conversation end signal sent first from the intended party is received as well, the CPU 22 ends the conversation processing. Furthermore, if a conversation end signal is received not from the intended party but from the mobile communication network as well, the CPU 22 ends the conversation processing.

When a call-out signal from the intended party is received by the antenna 12 in a state that the entire system is activated, the transmitter/receiver circuit 14 notifies the CPU 22 of the incoming. The CPU 22 outputs calling source information described in the incoming call notification from a main LCD monitor 32, and outputs an incoming call tone from an incoming call notifying speaker not shown. When a call-in operation is performed with the key input device 26, a telephone-communication-allowable state is established.

In the state that a telephone communication can be made, following processing is executed. A modulated audio signal (high frequency signal) sent from the intended party is received by the antenna 12. The received modulated audio signal is subjected to demodulation processing and decode processing by the transmitter/receiver circuit 14. The received voice signal thus obtained is output from a speaker 18.

A voice signal to be transmitted which is received by a microphone 16 is subjected to encoding processing and modulation processing by the transmitter/receiver circuit 14. The modulated audio signal thus generated is sent to the intended party by utilizing the antenna 12 as described above.

A Felica circuit 24 is Near Field Communication circuit configured based on a contactless IC card technique called "FeliCa" (registered trademark), and is provided with an antenna 24a for making Near Field communication. By making the antenna 24a and a reader/writer (not shown) close to each other in a state a Felica mode is selected with the key input device 26, Near Field Communication is performed.

A magnetic sensor 28 detects magnetism of the magnetic force 30, and outputs a value indicating 0-255 depending on the strength of the detected magnetism.

Figure 2:
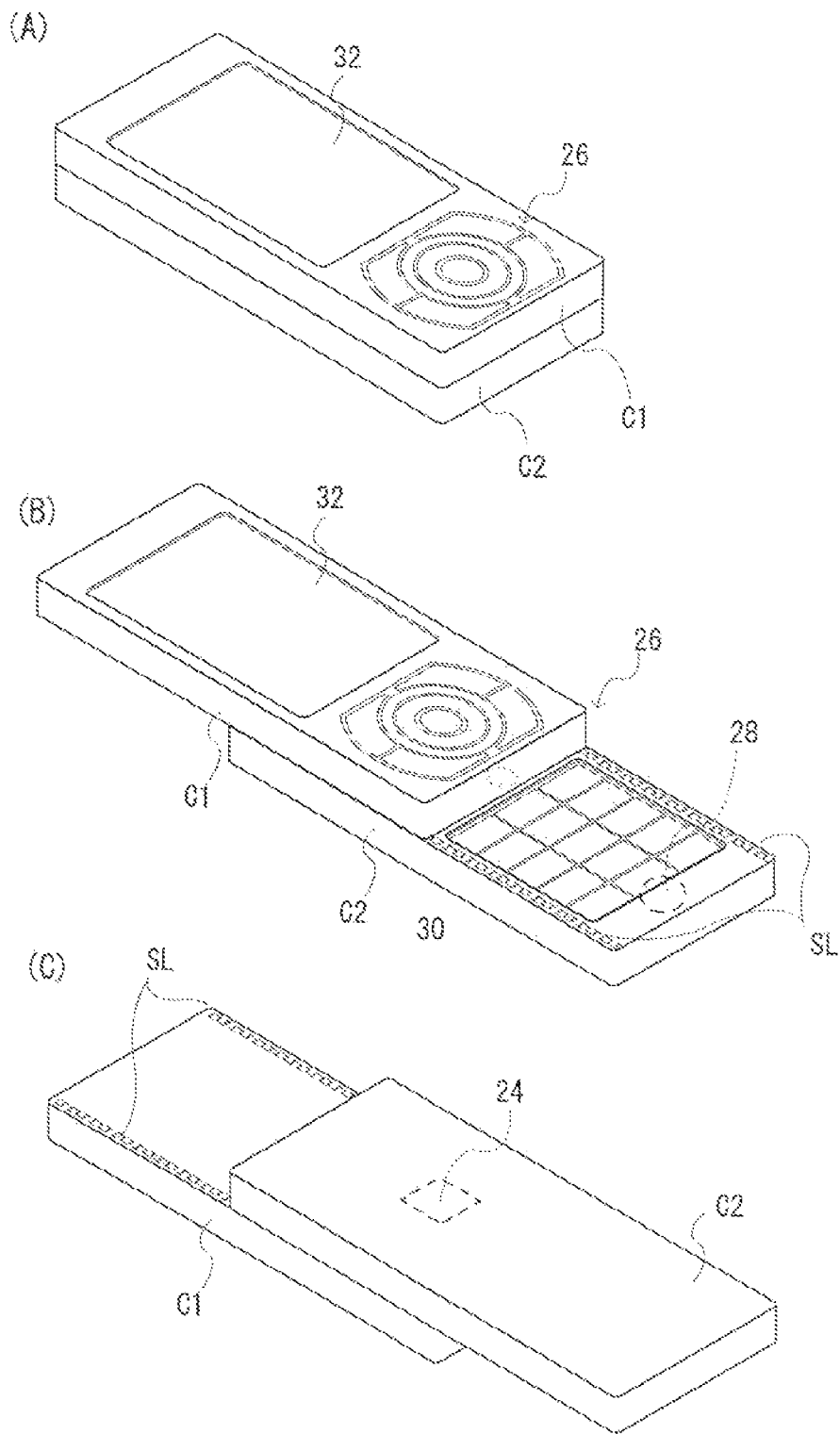
FIG. 2(A) is a perspective view showing an appearance of the first embodiment in a certain attitude.
FIG. 2(B) is a perspective view showing the appearance of the first embodiment in another attitude.
FIG. 2(C) is a perspective view showing the appearance of the first embodiment in a still another attitude.

Referring to FIG. 2(A)-FIG. 2(C), the mobile communication terminal 10 has cases C1 and C2 each of which is formed in a plate. The cases C1 and C2 are approximately the same in thickness. The Felica circuit 24 is contained in the case C2 such that the antenna 24a retains good receiving sensitivity on a bottom surface of the case C2. The key input device 26 is attached to the case C1 and the case C2 such that the operation keys are exposed from a top surface of the case C1 and a top surface of the case C2. The magnetic sensor 28 is contained in the case C2. A magnet 30 is contained in the case C1 so as to be the closest to the magnetic sensor 28 in a state shown in FIG. 2(A). The main LCD monitor 32 is attached to the case C1 such that the monitor screen is exposed on the top surface of the case C1.

That is, the main LCD monitor 32 is attached to the top surface of the case C1, and the magnet 30 is contained in the case C1. Furthermore, the magnetic sensor 28 is contained in the case C2, and the Felica circuit 24 is contained in the case C2. Then, the operation keys of the key input device 26 are attached to the top surfaces of the case C1 and the case C2.

A sliding mechanism SL is provided at both ends in a width direction of the bottom surface of the case C1 and at both ends in the width direction of the top surface of the case C2. That is, the case C1 can be slid from a state it is stacked on the case C2 in a longitudinal direction of the case C2. Furthermore, the sliding mechanism SL includes a sliding assist mechanism (not shown) to assist the sliding by a spring mechanism.

The magnetic sensor 28 outputs 255 being a maximum value in the state shown in FIG. 2(A), and outputs 0 being a minimum value in the state shown in FIG. 2(B) and FIG. 2(C). Then, the output value of the magnetic sensor 28 becomes small depending on a sliding amount when sliding is made from the FIG. 2(A) state to the FIG. 2(C) state through the FIG. 2(B) state. That is, in the closed state shown in FIG. 2(A), the magnetic sensor 28 outputs the maximum value, and in the open state shown in FIG. 2(B) and FIG. 2(C), the magnetic sensor 28 outputs the minimum value.

The CPU 22 performs switching processing between the open state and the closed state by comparing the output value of the magnetic force sensor 28 and a threshold value. The threshold value is the output value of the magnetic force sensor 28 when sliding is made to a limit position where the position of the antenna 24a is within a display range of the main LCD monitor 32. For example, in a case that the threshold value is 128, a state where the output value of the magnetic sensor 28 is from 255 being the maximum value to 128 shall be the closed state, and a state where the output value of the magnetic sensor 28 is from 127 to 0 being the minimum value shall be the opened position.

As described above, the Felica circuit 24 is contained in the case C2 such that the antenna 24a retains good receiving sensitivity on the bottom surface of the case C2. Accordingly, the Near Field Communication utilizing the Felica circuit 24 is performed by making the bottom surface of the case C2 close to the reader/writer. However, a user cannot perceive the position of the antenna 24a when making the bottom surface of the case C2 close to the reader/writer.

Thereupon, in a case that Near Field Communication utilizing the Felica circuit 24 is performed, the position of the antenna 24a contained in the case C2 is displayed on the main LCD32 attached to the top surface of the case C1.

More specifically, referring to FIG. 2(A)-FIG. 2(C) and FIG. 3(A)-FIG. 3(C), an assist mark 36 schematically represents a position of the antenna 24a with respect to the main LCD monitor 32 or a position of the antenna 24a with respect to the case C2 contained with the Felica circuit 24. A schematic view 38 schematically shows the operation keys of the key input device 26 attached to the top surface of the case C2.

In the closed state shown in FIG. 2(A), the opposite side of the bottom surface of the case C2 where the receiving sensitivity of the antenna 24a is retained in good condition shall be the top surface of the case C1 attached with the LCD monitor 32. Accordingly, within the display range of the main LCD monitor 32, the position of the antenna 24a is included. Thus, the main LCD monitor 32 displays the assist mark 36 at the position of the antenna 24a with respect to the display range of the main LCD monitor 32. Here, a display example to be displayed on the main LCD monitor 32 in the closed state is shown in FIG. 3(A).

That is, on the opposite side of the assist mark 36 displayed on the main LCD monitor 32, the antenna 24a exists. Then, the user is only necessary to make the surface where the receiving sensitivity of the antenna 24a is retained in good condition, that is, the bottom surface of the case C2 close to the reader/writer such that the position of the assist mark 36 displayed on the main LCD monitor 32 and the reader/writer are superimposed with each other.

In the open state shown in FIG. 2(B) and FIG. 2(C), the opposite side of the bottom surface of the case C2 where the receiving sensitivity of the antenna 24a is retained in good condition becomes the top surface of the case C2. Accordingly, within the display range of the main LCD monitor 32, the position of the antenna 24a is not included. Thus, the main LCD monitor 32 displays the schematic view 38 of the top surface of the case C2, and further displays the assist mark 36 at the position of the antenna 24a with respect to the top surface of the case C2. Here, a display example to be displayed on the main LCD monitor 32 in the open state is shown in FIG. 3(B).

That is, on the opposite side of the top surface of the case C2 corresponding to the schematic view 38 displayed on the main LCD monitor 32, the antenna 24a exists. Then, the user is only necessary to make the surface where the receiving sensitivity of the antenna 24a is retained in good condition, that is, the bottom surface of the case C2 close to the reader/writer on the top surface of the case C2 corresponding to the schematic view 38 displayed on the main LCD monitor 32 such that the position indicated by the assist mark 36 and the reader/writer are superimposed with each other.

Furthermore, in a case of the closed state and a change in the output value of the magnetic sensor 28, the CPU 22 detects a change of the position of the antenna 24a with respect to the main LCD monitor 32 from the output value of the magnetic sensor 28, and moves the assist mark 36 on the basis of the detection result. For example, in a case that the value of the magnetic sensor 28 continuously changes, the position of the antenna 24a with respect to the main LCD monitor 32 similarly changes, so that the assist mark 36 is displayed on the main LCD monitor 32 like animation.

That is, in a case that a sliding is made from the state shown in FIG. 2(A) to the state shown in FIG. 2(C), the CPU 22 moves the assist mark 36 from the dotted line position in the closed state to the solid line position as shown in the display example in FIG. 3(C). Thus, the user is only necessary to make the surface where the receiving sensitivity of the antenna 24a is retained in good condition, that is, the bottom surface of the case C2 close to the reader/writer in correspondence with the assist mark 36 gradually moved such that the position of the assist mark 36 displayed on the main LCD monitor 32 and the reader/writer are superimposed.

Figure 4:
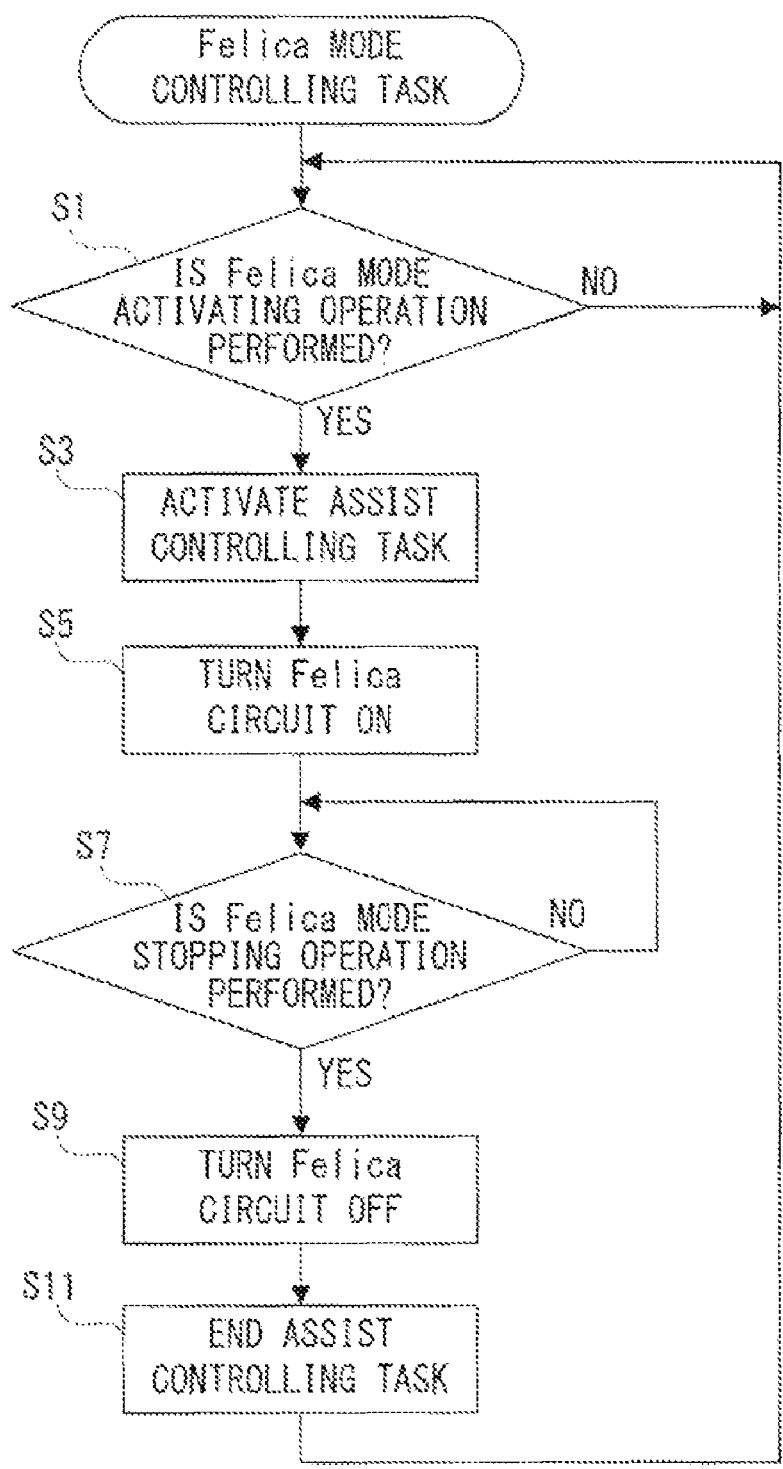
FIG. 4 is a flowchart showing a part of an operation of a CPU applied to the first embodiment.
Figure 5:
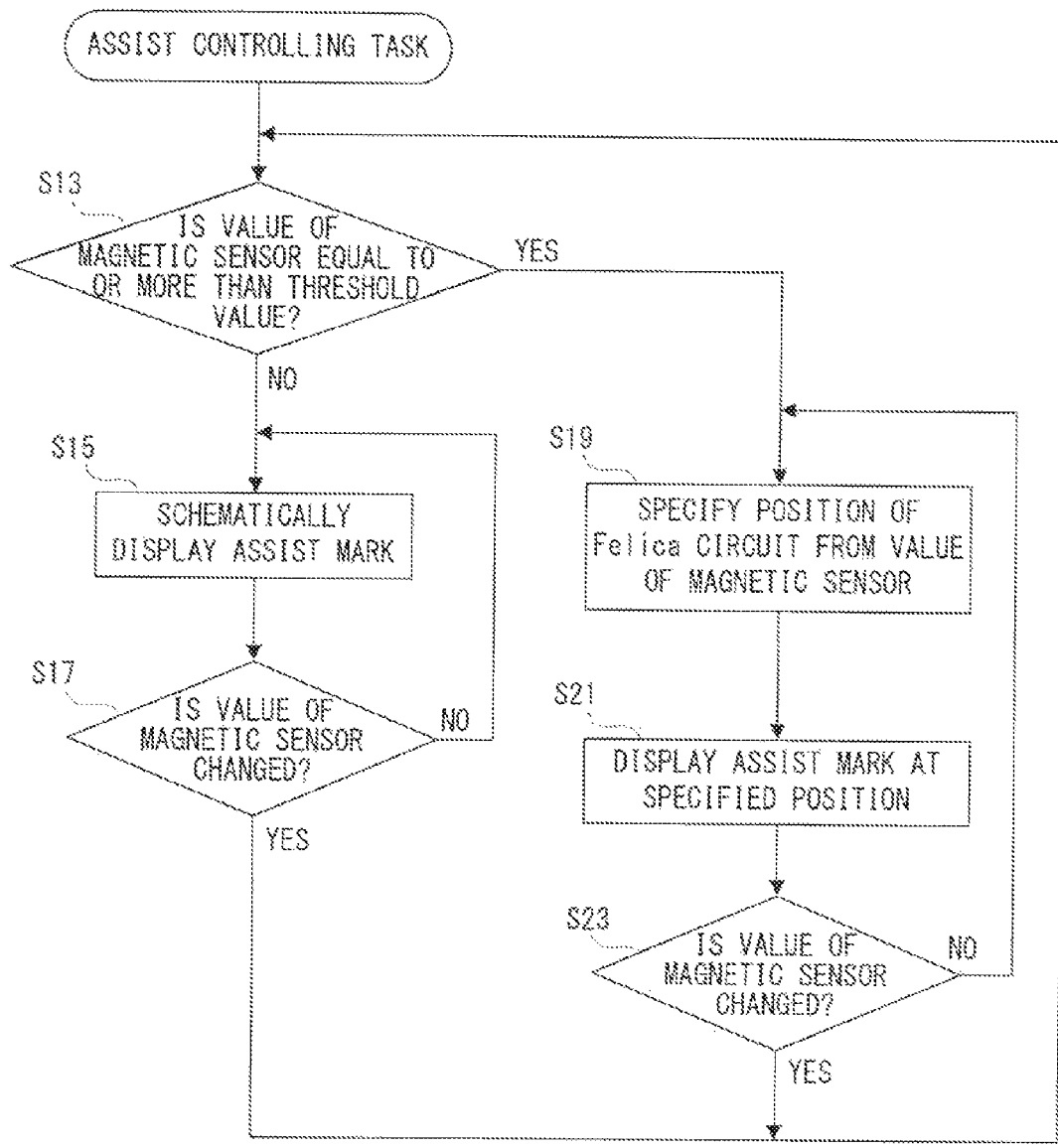
FIG. 5 is a flowchart showing another part of the operation of the CPU applied to the first embodiment.

The CPU 22 executes a plurality of tasks including a Felica mode controlling task shown in FIG. 4 and an assist controlling task shown in FIG. 5 in parallel. Here, the control program corresponding to these tasks is stored in the flash memory 20, and the image data of the assist mark 36 and the schematic view 38 shown in FIG. 3(A)-FIG. 3(C) are further stored in the flash memory 20 and read from the flash memory 20 in correspondence with the processing of the assist controlling task.

First, the Felica mode controlling task is explained. Referring to FIG. 4, in a step S1, it is determined whether or not a Felica mode activating operation is performed on the key input device 26. If "YES" here, the process proceeds to a step S3 for establishing a state that the Felica circuit 24 is able to be turned on, to activate the assist controlling task. If "NO" here, the process returns to the step S1 to repeat the processing in the step S1 until a Felica mode activating operation is performed on the key input device 26. In a following step S5, the Felica circuit 24 is turned on so as to be able to perform Near Field Communication utilizing the Felica circuit 24. In a next step S7, it is determined whether or not a Felica mode stopping operation is performed on the key input device 26. If "NO" here, the process in the step S7 is repetitively performed until the Felica mode stopping operation is performed on the key input device 26. If "YES" here, the process proceeds to a step S9 to turn the Felica circuit 24 off in order to end the Near Field Communication utilizing the Felica circuit 24. Succeedingly, in a step S11, the Near Field Communication utilizing the Felica circuit 24 is ended, so that, the process returns to the step S1 after ending the assist controlling task.

Next, the assist controlling task is explained. Referring to FIG. 5, in a step S13, it is determined whether or not the output value of the magnetic sensor 28 is equal to or more than the threshold value. If "NO" here, the output value of the magnetic sensor 28 is equal to or less than the threshold value, resulting in the open state shown in FIG. 2(B) and FIG. 2(C). Then, the process proceeds to a step S15 to display the schematic view 38 of the top surface of the case C2 on the main LCD monitor 32, and display the assist mark 36 at the position of the antenna 24a with respect to the top surface of the case C2. In a following step S17, it is determined whether or not the output value of the magnetic sensor 28 changes. If "YES" here, the process returns to the step S13 in order to determine whether or not the output of the magnetic sensor 28 is equal to or more than the threshold value. If "NO" here, the process returns to the step S15 to display the schematic view 38 of the top surface of the case C2 on the main LCD monitor 32, and to continuously display the assist mark 36 at the position of the antenna 24a with respect to the top surface of the case C2.

Alternatively, if "YES" in the step S13, the output value of the magnetic sensor 28 is equal to or more than the threshold value, resulting in the closed state shown in FIG. 2(A). Then, the process proceeds to a step S19 to specify the position of the Felica circuit 24 with respect to the main LCD monitor 32 from the output value of the magnetic sensor 28. In a following step S21, the assist mark 36 is displayed at the position of the Felica circuit 24 specified in the step S19 on the main LCD monitor 32.

In a further following step S23, it is determined whether or not the output value of the magnetic sensor 28 changes. If "YES" here, the process returns to the step S13 to determine again whether or not the output of the magnetic sensor 28 is equal to or more than the threshold value. If "NO" here, the process returns to the step S19 to repeat the processing in the steps S19-S21, so that the assist mark 36 is continuously displayed at the position of the Felica circuit 24 specified in the step S19.

Furthermore, in a case of the closed state, when the case C1 slides with respect to the case C2, the processing in the step S13 and steps S19-S23 are repeated. Thus, the position of the antenna 24a with respect to the main LCD monitor 32 is changed as well, and thus the assist mark 36 is displayed on the main LCD monitor 32 like animation.

As understood from the above description, each of the case C1 and the case C2 is formed in a plate. The main LCD monitor 32 is attached to the top surface of the case C1. The Felica circuit 24 and the antenna 24a are contained in the case C2. The sliding mechanism SL couples the case C1 and the case C2 such that the state of the case C1 with respect to the case C2 can be shifted. The magnetic sensor 28 detects the state of the case C1 with respect to the case C2. The processing in the step S13 determines whether or not the antenna 24a is included within the display range of the main LCD monitor 32. If "YES" in the determination in the step S13, the processing in the step S15 displays on the main LCD monitor 32 the assist mark 36 indicating the position of the antenna 24a with respect to the main LCD monitor 32. If "NO" in the determination in the step S13, the processing in the step S21 displays the schematic view 38 of the top surface of the case C2 on the main LCD monitor 32, and further displays the assist mark 36 at the position of the antenna 24a with respect to the top surface of the case C2. Thus, when the Felica circuit 24 makes Near Field Communication with the reader/writer, the position of the antenna can be clearly perceived.

It should be noted that in this first embodiment, the sliding mechanism SL is adopted, but as a second embodiment, a rotating mechanism K shown in FIG. 6(A)-FIG. 6(D) may be adopted in place of the sliding mechanism SL.

Figure 19:
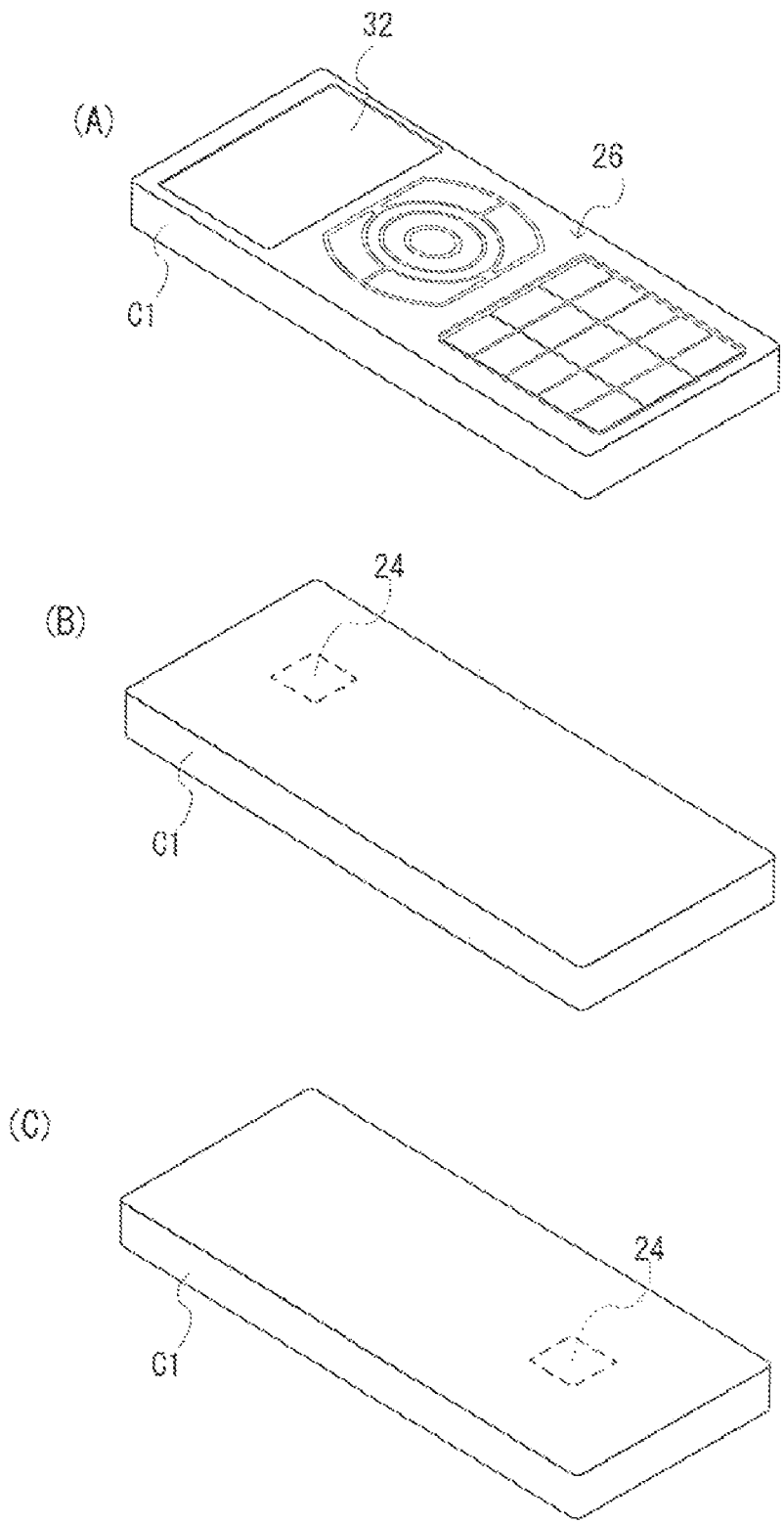
FIG. 19(A) is a perspective view showing an appearance of the fifth embodiment in a certain attitude.
FIG. 19(B) is a perspective view showing the appearance of the fifth embodiment in another attitude.
FIG. 19(C) is a perspective view showing the appearance of the fifth embodiment in a still another attitude.

Furthermore, as a third embodiment, a hinge mechanism H1 or a hinge mechanism H2 shown in FIG. 8(A)-FIG. 8(C), FIG. 9(A)-FIG. 9(C), FIG. 10 and FIG. 12(A)-FIG. 12(B) may be adopted in place of the sliding mechanism SL. In addition, as a fourth embodiment, a rotating mechanism K and a hinge mechanism H2 shown in FIG. 15(A)-FIG. 15(C) may be simultaneously adopted for assistance in place of the sliding mechanism SL. Then, as a fifth embodiment, processing of an assist controlling task may be performed in a straight mobile communication terminal 10 configured only by a case C1 as shown in FIG. 19(A)-FIG. 19(C).

Next, the second embodiment, the third embodiment, the fourth embodiment and the fifth embodiment are explained.
<Second Embodiment>

In the second embodiment, the rotating mechanism K is adopted to be of configuration as shown in FIG. 1 in place of the sliding mechanism SL. Furthermore, the second embodiment is the same as the first embodiment in the configuration of the mobile communication terminal in FIG. 1 and the processing of Felica mode controlling task in FIG. 4 which are used for the explanation of the first embodiment, and therefore, in the description of the second embodiment, these drawings and the explanations are omitted.

Referring to FIG. 6(A)-FIG. 6(D), the Felica circuit 24 is contained in a case C2 such that an antenna 24a retains good receiving sensitivity on a bottom surface of the case C2. A key input device 26 is attached to the case C2 such that the operation keys are exposed from the top surface of the case C2. A magnetic sensor 28 is contained in the case C2. The magnet 30 is contained in a case C1 so as to be closest to the magnetic sensor 28 in states of FIG. 6(A) and FIG. 6(B). A main LCD monitor 32 is attached to the case C1 such that the monitor screen is exposed from the top surface of the case C1.

The rotating mechanism K is formed at one end in the longitudinal direction of the outer surface of the case C2 as a rotating mechanism. The case C1 is coupled with the rotating mechanism K on the bottom surface at the one end in the longitudinal direction. Furthermore, the rotating mechanism K rotates the case C1 in a range of from 0 degrees-360 degrees with reference to an axis AX1 vertical to the top surface of the case C2 in a state that the case C1 is stacked on the case C2. Thus, the case C1 can have a position with respect to the case C2 as shown in FIG. 6(A)-FIG. 6(D).

Figure 6:
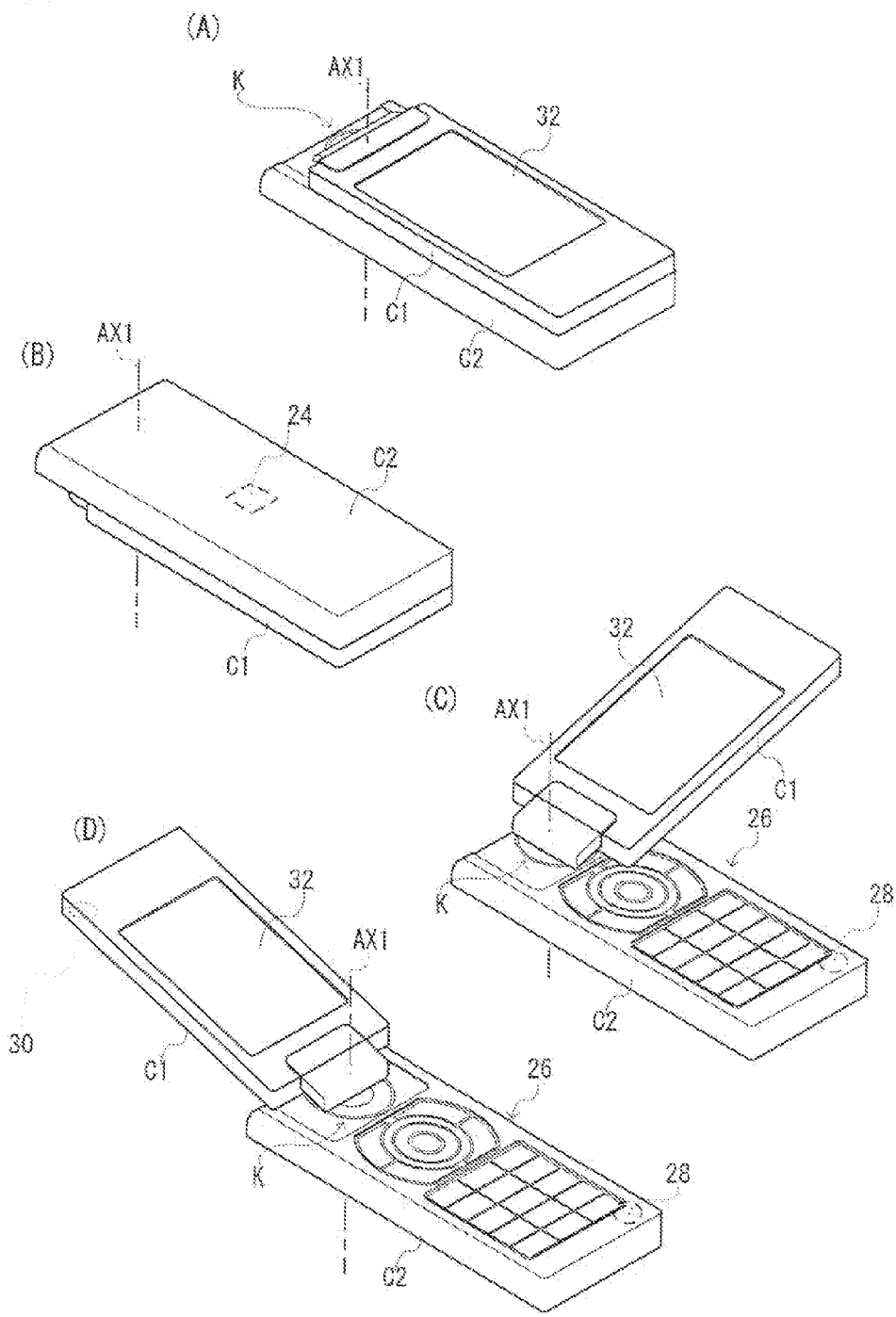
FIG. 6(A) is a perspective view showing an appearance of a second embodiment in a certain attitude.
FIG. 6(B) is a perspective view showing the appearance of the second embodiment in another attitude.
FIG. 6(C) is a perspective view showing the appearance of the second embodiment in a still another attitude.
FIG. 6(D) is showing the appearance of the second embodiment in a further attitude.

The magnetic sensor 28 outputs 255 being a maximum value in the states shown in FIG. 6(A) and FIG. 6(B), and outputs 0 being a minimum value in the state shown in FIG. 6(D). Furthermore, in the state shown in FIG. 6(C), the magnetic sensor 28 does not output the minimum value, but this is regarded as an open state. Then, when a rotation is made from FIG. 6(A) and FIG. 6(B) to FIG. 6(D), the output value of the magnetic sensor 28 takes a smaller value depending on the rotation amount. That is, in the closed state shown in FIG. 6(A) and FIG. 6(B), the magnetic sensor 28 outputs the maximum value, and in the open state shown in FIG. 6(D), the magnetic sensor 28 outputs the minimum value.

In the second embodiment, a threshold value in switching process between the open state and the closed state by the CPU 22 shall be an output value of the magnetic force sensor 28 when rotating is made to a limit position where the position of the antenna 24a is within a display range of the main LCD monitor 32.

Referring to FIG. 6(A)-FIG. 6(D) and FIG. 3(A)-FIG. 3(B), in the second embodiment, the schematic view 38 schematically shows the operation keys of the key input device 26 attached to the top surface of the case C2.

In the closed state shown in FIG. 6(A) and FIG. 6(B), the opposite side of the bottom surface of the case C2 contained with the antenna 24a shall be the top surface of the case C1 attached with the main LCD monitor 32. Accordingly, the position of the antenna 24a is included within the display range of the main LCD monitor 32. Thus, similar to the first embodiment, the main LCD monitor 32 displays the assist mark 36 at the position of the antenna 24a with respect to the display range of the main LCD monitor 32.

That is, on the opposite side of the assist mark 36 displayed on the main LCD monitor 32, the antenna 24a exists. Thus, the user is only necessary to make the surface where the receiving sensitivity of the antenna 24a is retained in good condition, that is, the bottom surface of the case C2 close to the reader/writer such that the position of the assist mark 36 displayed on the main LCD monitor 32 and the reader/writer are superimposed with each other.

In the open state shown in FIG. 6(C) and FIG. 6(D), the opposite side of the bottom surface of the case C2 where the receiving sensitivity of the antenna 24a is retained in good condition is the top surface of the case C2. Accordingly, the position of the antenna 24a is not included within the display range of the main LCD monitor 32. Thus, similar to the first embodiment, the main LCD monitor 32 displays the schematic view 38 of the top surface of the case C2, and displays the assist mark 36 at the position of the antenna 24a with respect to the top surface of the case C2.

That is, on the opposite side of the top surface of the case C2 corresponding to the schematic view 38 displayed on the main LCD monitor 32, the antenna 24a exists. Then, the user is only necessary to make the surface where the receiving sensitivity of the antenna 24a is retained in good condition, that is, the bottom surface of the case C2 close to the reader/writer on the top surface of the case C2 corresponding to the schematic view 38 displayed on the main LCD monitor 32 such that the position indicated by the assist mark 36 and the reader/writer are superimposed with each other.

Furthermore, in a case of the closed state and a change in the output value of the magnetic sensor 28, the CPU 22 detects the change of the position of the antenna 24a with respect to the main LCD monitor 32 from the output value of the magnetic sensor 28, and moves the assist mark 36 on the basis of the detection result. For example, in a case that the value of the magnetic sensor 28 continuously changes, the position of the antenna 24a with respect to the main LCD monitor 32 similarly changes, so that the assist mark 36 is displayed on the main LCD monitor 32 like animation.

That is, in a case that a rotation is made from the states in FIG. 6(A) and FIG. 6(B) to the states in FIG. 6(C) and FIG. 6(D), the position of the assist mark 36 is gradually moved in the closed state. Thus, the user is only necessary to make the surface where the receiving sensitivity of the antenna 24a is retained in good condition, that is, the bottom surface of the case C2 close to the reader/writer in correspondence with the gradually moved position of the assist mark 36 such that the position of the assist mark 36 displayed on the main LCD monitor 32 and the reader/writer are superimposed with each other.

The CPU 22 executes a plurality of tasks in parallel including the Felica mode controlling task shown in FIG. 4 and the assist controlling task shown in FIG. 5. Similar to the first embodiment, a control program corresponding to these tasks is stored in the flash memory 20, and the image data of the assist mark 36 and the schematic view 38 shown in FIG. 3(A)-FIG. 3(C) are stored in the flash memory 20 and read from the flash memory 20 in correspondence with the processing of the assist controlling task.

The processing of the Felica mode controlling task in the second embodiment is the same as that of the first embodiment, and is thus omitted. The assist controlling task of the second embodiment is explained. Referring to FIG. 5, in a step S13, it is determined whether or not the output value of the magnetic sensor 28 is equal to or more than the threshold value. If "NO" here, the output value of the magnetic sensor 28 is equal to or less than the threshold value, resulting in the open state shown in FIG. 6(C) and FIG. 6(D). Then, the process proceeds to a step S15 to display the schematic view 38 of the top surface of the case C2 on the main LCD monitor 32, and display the assist mark 36 at the position of the antenna 24a with respect to the top surface of the case C2. In a following step S17, it is determined whether or not the output value of the magnetic sensor 28 changes. If "YES" here, the process returns to the step S13 in order to determine again whether or not the output of the magnetic sensor 28 is equal to or more than the threshold value. If "NO" here, the process returns to the step S15 to display the schematic view 38 of the top surface of the case C2 on the main LCD monitor 32, and continuously display the assist mark 36 at the position of the antenna 24a with respect to the top surface of the case C2.

Furthermore, if "YES" in the step S13, the output value of the magnetic sensor 28 becomes equal to or more than the threshold value, resulting in the closed state shown in FIG. 6(A) and FIG. 6(B). Then, the process proceeds to a step S19 to specify the position of the Felica circuit 24 with respect to the main LCD monitor 32 from the output value of the magnetic sensor 28. In a following step S21, the assist mark 36 is displayed at the position of the Felica circuit 24 specified in the step S19 on the main LCD monitor 32.

In a following step S23, it is determined whether or not the output value of the magnetic sensor 28 changes. If "YES" here, the process returns to the step S13 in order to determine again whether or not the output of the magnetic sensor 28 is equal to or more than the threshold value. If "NO" here, the process returns to the step S19 to repeat the processing in the steps S19-S21, so that the assist mark 36 is continuously displayed at the position of the Felica circuit 24 specified in the step S19.

Furthermore, when the case C1 rotates with respect to the case C2 in the closed state, the processing in the step S13 and the steps S19-S23 are repeated. Thus, the position of the antenna 24a with respect to the main LCD monitor 32 is also changed, so that the assist mark 36 is displayed on the main LCD monitor 32 like animation.

<Third Embodiment>

Figure 7:
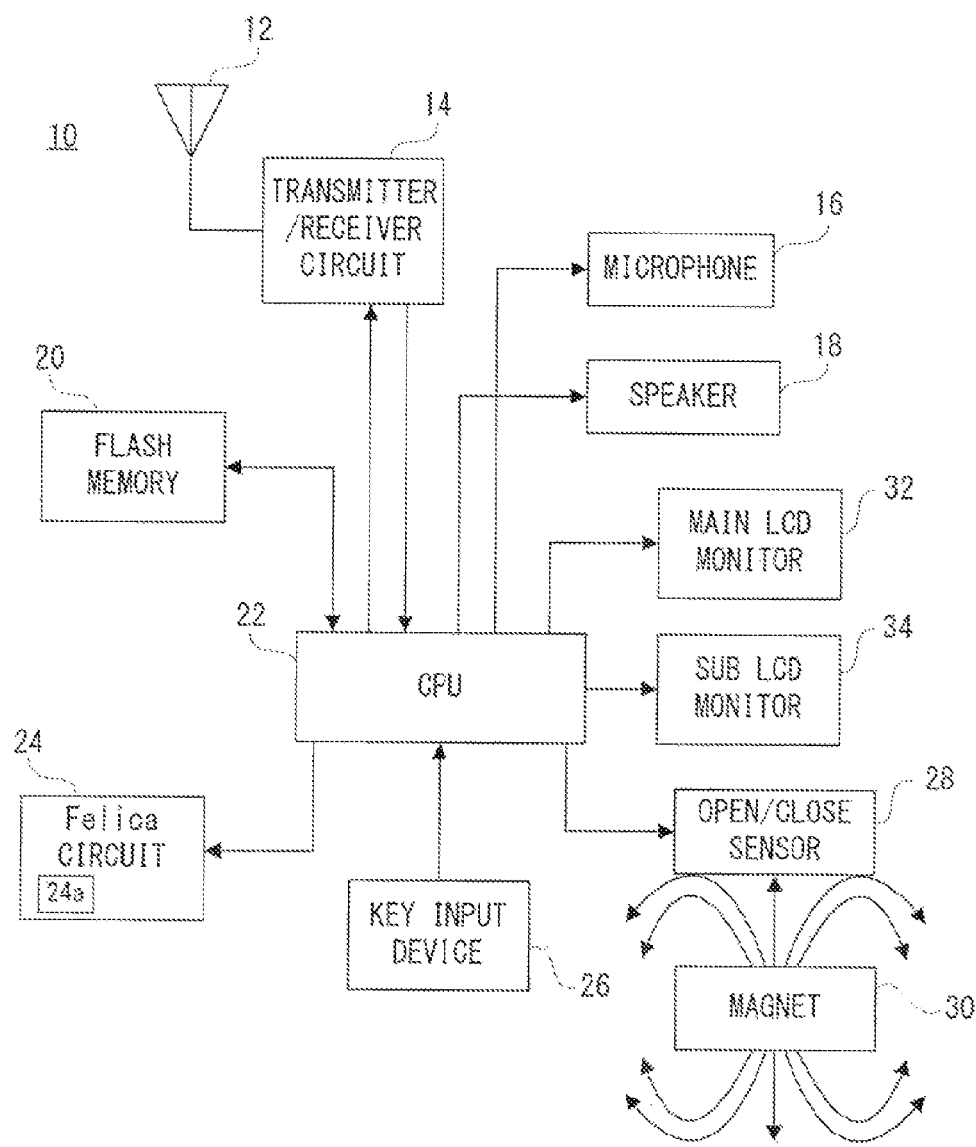
FIG. 7 is a block diagram showing a third embodiment of the present invention.

In a third embodiment, a hinge mechanism H1 or a hinge mechanism H2 is adopted in a configuration shown in FIG. 7 in place of the sliding mechanism SL. Furthermore, the third embodiment is the same as that of the Felica mode controlling task in FIG. 4 used in the explanation of the first embodiment, so that the explanation of FIG. 4 is omitted in the explanation of the third embodiment.

Referring to FIG. 7, the mobile communication terminal 10 of the third embodiment has a sub LCD monitor 34 in addition to the mobile communication terminal 10 of the first embodiment.

Figure 8:
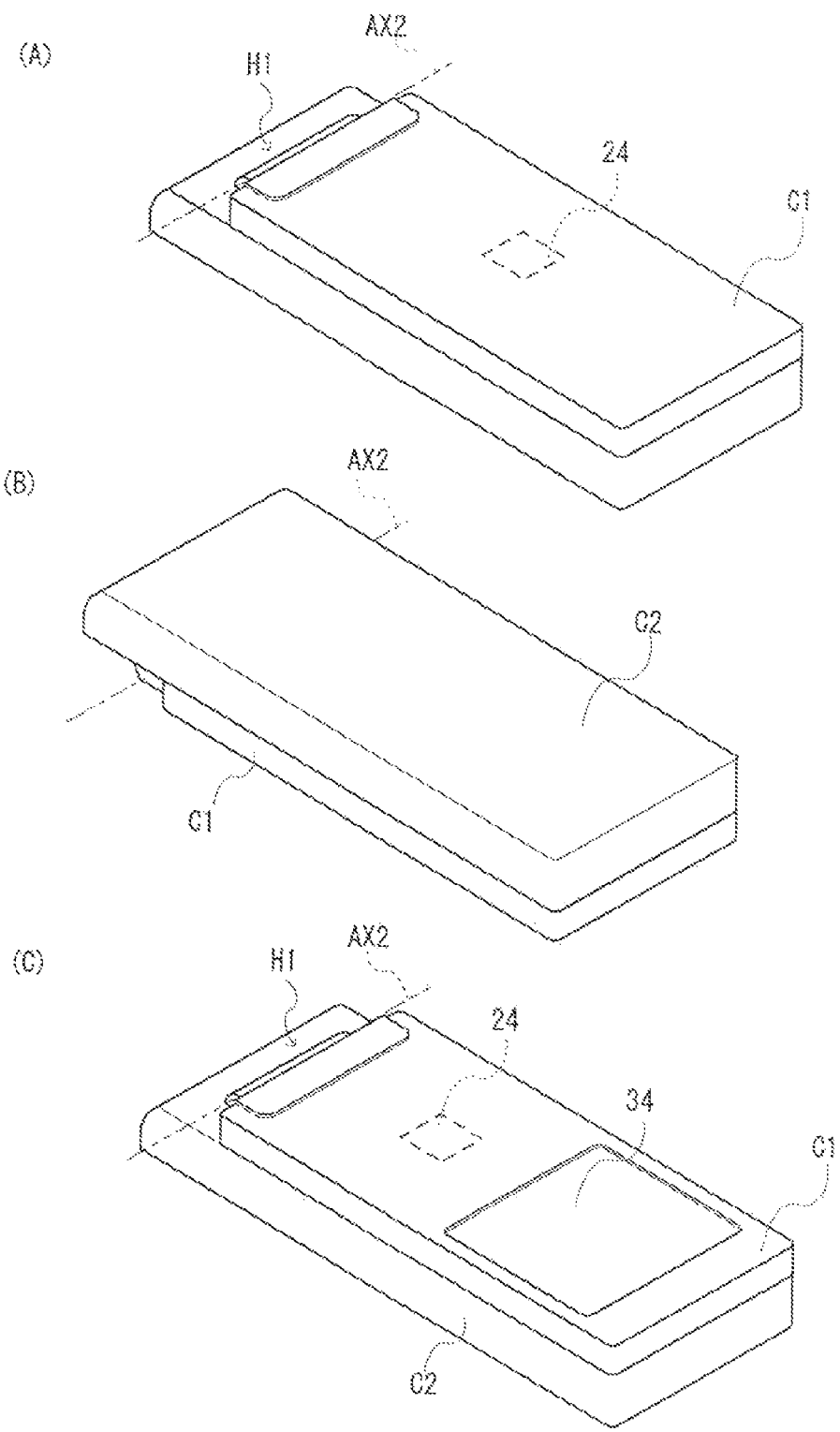
FIG. 8(A) is a perspective view showing an appearance of the third embodiment in a certain attitude.
FIG. 8(B) is a perspective view showing the appearance of the third embodiment in another attitude.
FIG. 8(C) is a perspective view showing the appearance of the third embodiment in a still another attitude.
Figure 9:
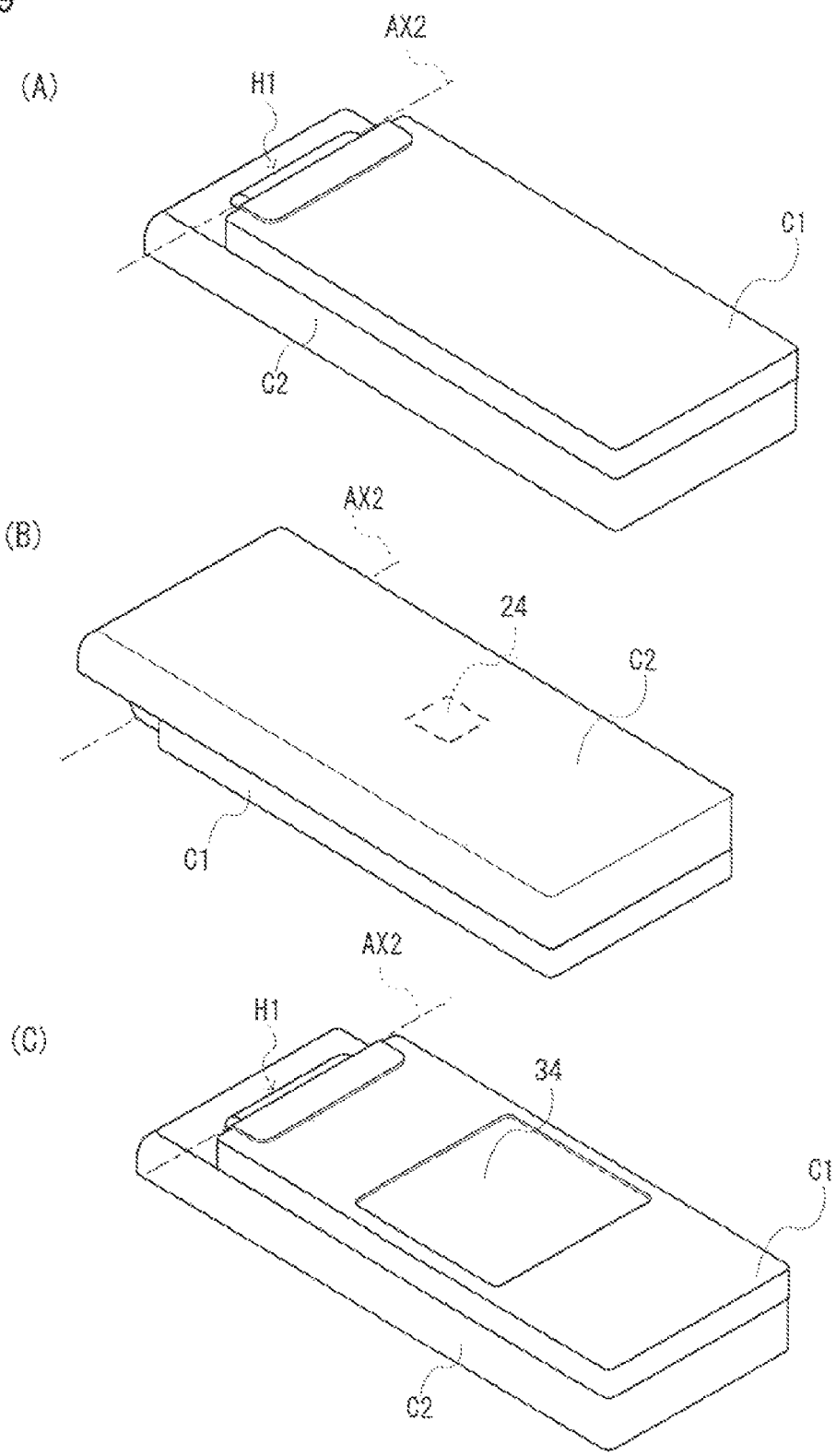
FIG. 9(A) is a perspective view showing the appearance of the third embodiment in a further attitude.
FIG. 9(B) is a perspective view showing the appearance of the third embodiment in a still further attitude.
FIG. 9(C) is a perspective view showing the appearance of the third embodiment in another attitude.

Referring to FIG. 8(A)-FIG. 8(C), FIG. 9(A)-FIG. 9(C) and FIG. 10, in FIG. 8(A)-FIG. 8(C), the Felica circuit 24 is contained in a case C1 such that the antenna 24a retains good receiving sensitivity on an outer surface of the case C1. In FIG. 9(A)-FIG. 9(C), the Felica circuit 24 is contained in the case C2 such that the antenna 24a retains good receiving sensitivity on the outer surface of the case C2. The key input device 26 is attached to the case C2 such that the operation keys are exposed from the inner surface of the case C2. The magnetic sensor 28 is contained in the case C2. The magnet 30 is contained in the case C1 so as to be the closest to the magnetic sensor 28 in the states in FIG. 8(A)-FIG. 8(C) and FIG. 9(A)-FIG. 9(C). The main LCD monitor 32 is attached to the case C1 such that the monitor screen is exposed from the inner surface of the case C2. The monitor screen of the sub LCD monitor 34 is attached to the case C1 so as to be exposed from the outer surface being opposed to the inner surface to which the main LCD monitor 32 of the case C1 is attached. Furthermore, in FIG. 8(A) and FIG. 9(A), the sub LCD monitor 34 is not attached to the case C1. The hinge mechanism H1 is formed at one end in the longitudinal direction of the inner surface of the case C2 as a hinge mechanism. The case C1 is coupled with the hinge mechanism H1 on the side surface at the one end in the longitudinal direction. Furthermore, the hinge mechanism H1 moves the case C1 with reference to an axis AX2 being in parallel with a short side of the inner surface of the case C2 in a state that the case C1 is stacked on the case C2. That is, the case C1 and the case C2 is opened and closed according to a rotation taking the axis AX2 as a reference. Thus, the case C1 can be positioned with respect to the case C2 shown in FIG. 8(A)-FIG. 8(C), FIG. 9(A)-FIG. 9(C) and FIG. 10.

Figure 10:
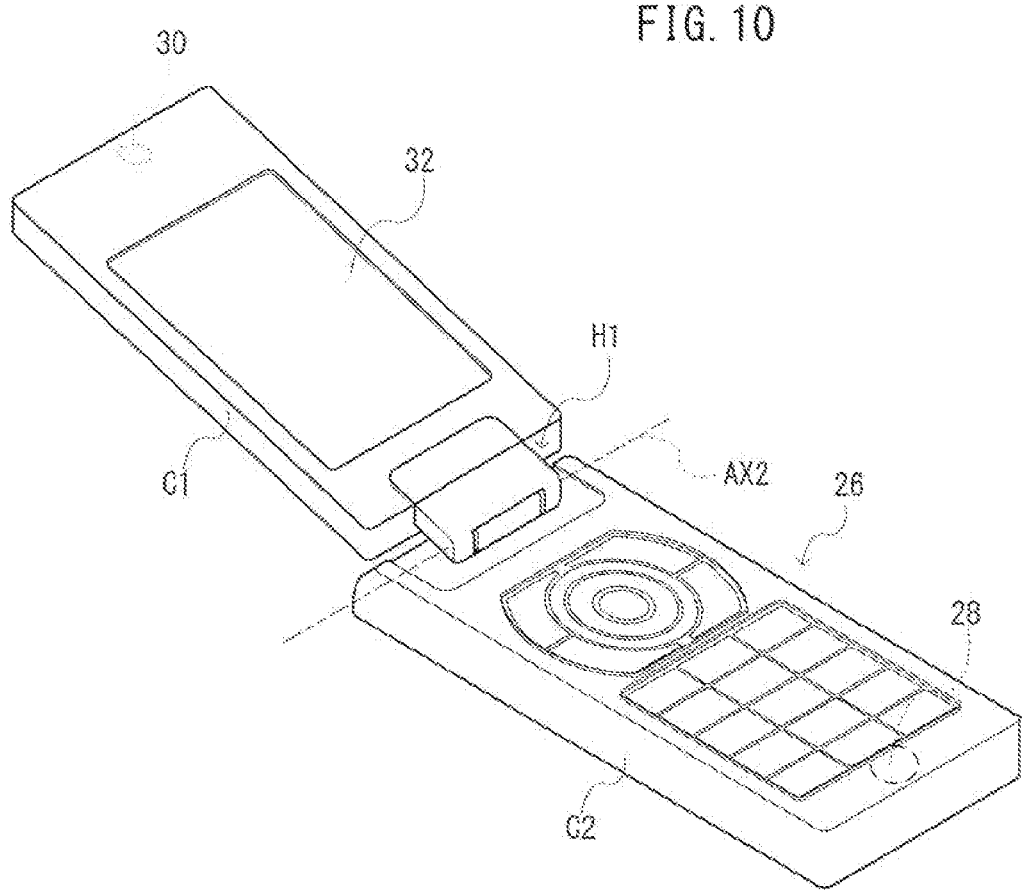
FIG. 10 is a perspective view showing the appearance of the third embodiment in still another attitude.

The magnetic sensor 28 outputs 255 being a maximum value in the states shown in FIG. 8(A)-FIG. 8(C) and FIG. 9(A)-FIG. 9(C), and outputs 0 being a minimum value in the state shown in FIG. 10. That is, in the closed state shown in FIG. 8(A)-FIG. 8(C) and FIG. 9(A)-FIG. 9(C), the magnetic sensor 28 outputs the maximum value, and in the open state shown in FIG. 10, the magnetic sensor 28 outputs the minimum value.

The switching processing between the open state and the closed state by the CPU 22 is performed depending on not the threshold value adopted in the first embodiment and second embodiment, but on whether or not the output of the magnetic sensor 28 is the maximum value.

The sub LCD monitor 34 can display the assist mark 36, the schematic view 38 and the character string.

Referring to FIG. 8(A)-FIG. 8(C), FIG. 9(A)-FIG. 9(C), FIG. 10 and FIG. 3(A)-FIG. 3(B), in the third embodiment, the schematic view 38 schematically represents the operation keys of the key input device 26 attached to the inner surface of the case C2. Furthermore, in FIG. 8(A) and FIG. 9(A), the sub LCD monitor 34 is not attached to the case C1.

Figure 11:
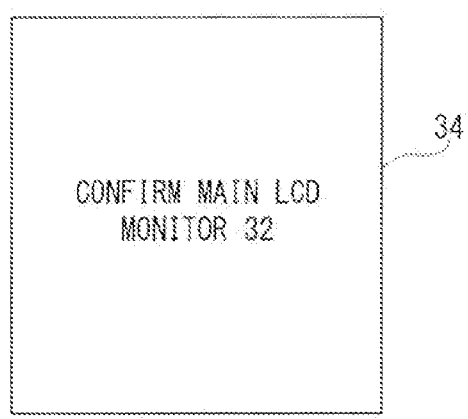
FIG. 11 is a display example to be displayed on a sub LCD monitor applied to the third embodiment.
Figure 12:
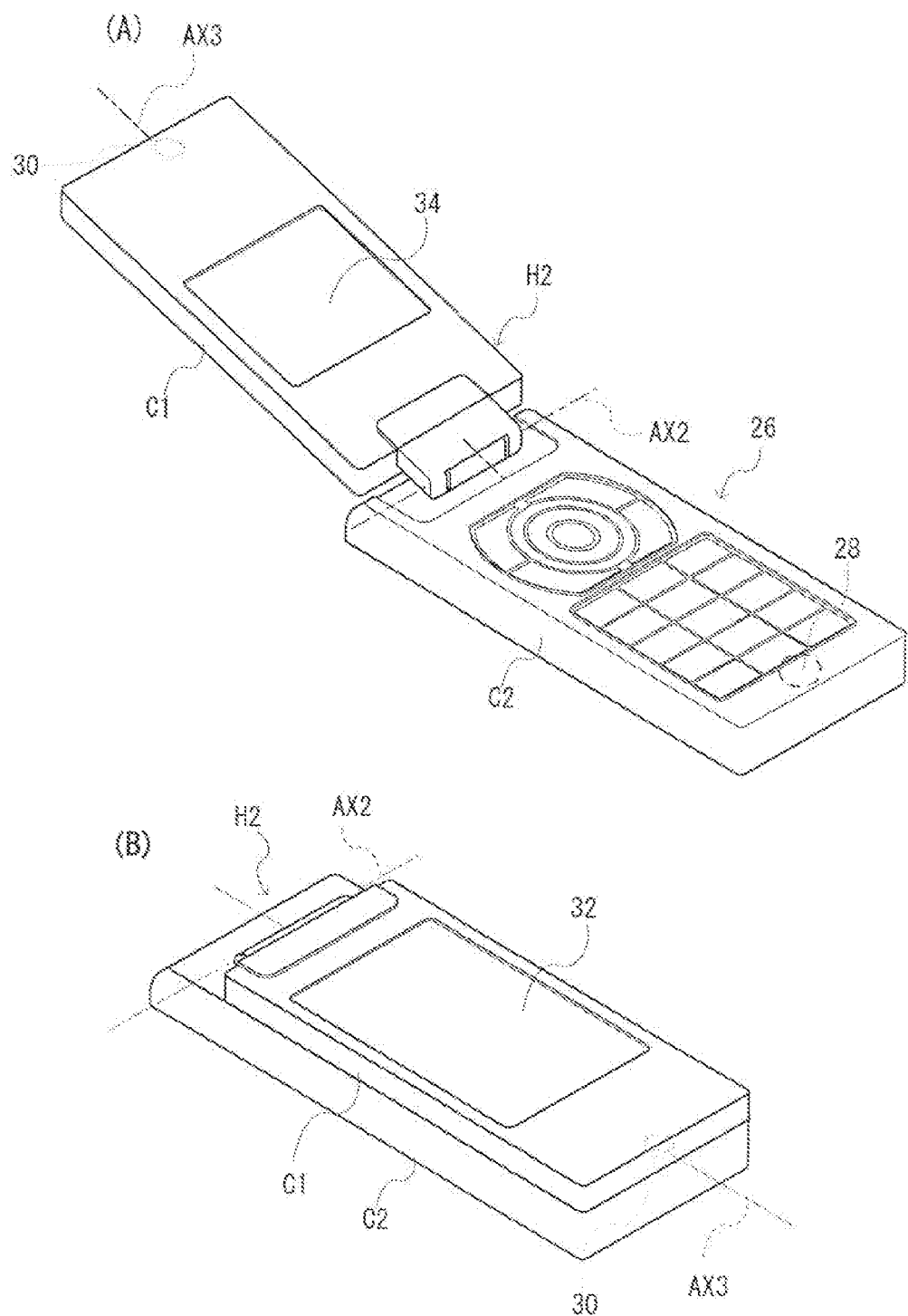
FIG. 12(A) is a perspective view showing the appearance of the third embodiment in a further attitude.
FIG. 12(B) is a perspective view showing the appearance of the third embodiment in a still further attitude.

In the closed state shown in FIG. 8(A)-FIG. 8(C), the opposite surface of the outer surface of the case C1 where the receiving sensitivity of the antenna 24a is retained in good condition becomes the inner surface of the case C1 to which the main LCD monitor 32 is attached. Accordingly, the position of the antenna 24a is included in the display range of the main LCD monitor 32. However, it is impossible to display the main LCD monitor 32 in the closed state. Thus, the sub LCD monitor 34 is attached to the outer surface of the case 1. Furthermore, an attaching position of the sub LCD monitor 34 is shown in FIG. 8(C). The sub LCD monitor 34 displays a character string prompting the user to confirm the main LCD monitor 32. A display example of the character string prompting the user to confirm the main LCD monitor 32 is shown in FIG. 11. That is, the user is only necessary to shift to the open state shown in FIG. 10 according to the character string displayed on the sub LCD monitor 34 and confirm the main LCD monitor 32.

In the closed state shown in FIG. 9(A)-FIG. 9(C), the opposite side of the outer surface of the case C2 where the receiving sensitivity of the antenna 24a is retained in good condition shall be the outer surface of the case C1 attached with the sub LCD monitor 34. Accordingly, the position of the antenna 24a is included within the display range of the sub LCD monitor 34. Thus, similar to FIG. 8(C), the sub LCD monitor 34 is attached to the outer surface of the case 1. Furthermore, the attaching position of the sub LCD monitor 34 is as shown in FIG. 9(C). The sub LCD monitor 34 displays the assist mark 36 at the position of the antenna 24a with respect to the display range of the main LCD monitor 32.

That is, on the opposite side of the assist mark 36 displayed on the sub LCD monitor 34, the antenna 24a exists. Thus, the user is only necessary to make the surface where the receiving sensitivity of the antenna 24a is retained in good condition, that is, the outer surface of the case C2 close to the reader/writer such that the position of the assist mark 36 displayed on the sub LCD monitor 34 and the reader/writer are superimposed with each other.

In the open state shown in FIG. 10, the displayed content of the main LCD monitor 32 is different depending on the surface where the receiving sensitivity of the antenna 24a is retained in good condition.

In a case that the surface where the receiving sensitivity of the antenna 24a is retained in good condition is the outer surface of the case C1, the opposite side of the outer surface of the case C1 where the receiving sensitivity of the antenna 24a is retained in good condition is the inner surface of the case C1 attached with the main LCD monitor 32. Accordingly, within the display range of the main LCD monitor 32, the position of the antenna 24a is included. Thus, similar to the first embodiment, the main LCD monitor 32 displays the assist mark 36 at the position of the antenna 24a with respect to the display range of the main LCD monitor 32.

That is, on the opposite side of the assist mark 36 displayed on the main LCD monitor 32, the antenna 24a exists. Thus, the user is only necessary to make the surface where the receiving sensitivity of the antenna 24a is retained in good condition, that is, the outer surface of the case C1 close to the reader/writer such that the position of the assist mark 36 displayed on the main LCD monitor 32 and the reader/writer are superimposed with each other.

In a case that the surface where the receiving sensitivity of the antenna 24a is retained in good condition is the outer surface of the case C2, the opposite surface of the outer surface of the case C2 where the receiving sensitivity of the antenna 24a retains in good condition becomes the inner surface of the case C2. Accordingly, within the display range of the main LCD monitor 32, the position of the antenna 24a is not included. Thus, the main LCD monitor 32 displays the schematic view 38 of the inner surface of the case C2, and further displays the assist mark 36 at the position of the antenna 24a with respect to the inner surface of the case C2.

In addition, in the open state shown in FIG. 10, in a case that the sub LCD monitor 34 is attached to the outer surface of the case C1, the sub LCD monitor 34 displays a character string prompting the user to confirm the main LCD monitor 32.

That is, the user is only necessary to shift to the open state shown in FIG. 10 according to the character string displayed on the sub LCD monitor 34 and confirm the main LCD monitor 32.

Referring to FIG. 12(A) and FIG. 12(B), the hinge mechanism H2 is provided with an axis AX3 in addition to the axis AX2. The Felica circuit 24 contained in the case C2 such that the good receiving sensitivity can be retained on the outer surface of the case C2.

The hinge mechanism H2 moves the case C1 with reference to the axis AX2 in parallel with the short side of the inner surface of the case C2 in a state that the case C1 is stacked on the case C2, and rotates the case C1 with reference to the axis AX3 being vertical with the axis AX2 and in parallel with the inner surface of the case C1. That is, the direction of the face of the case C1 is reversed by a rotation with reference to the axis AX3. Thus, the case C1 can be positioned with respect to the case C2 as shown in FIG. 12(A) and FIG. 12(B) as well.

If the hinge mechanism H2 is adopted, the magnetic sensor 28 outputs 255 being the maximum value in the states shown in FIG. 8(A)-FIG. 8(C), FIG. 9(A)-FIG. 9(C) and FIG. 12(B), and outputs 0 being the minimum value in the states shown in FIG. 10 and FIG. 12(A). That is, in the closed state shown in FIG. 8(A)-FIG. 8(C), FIG. 9(A)-FIG. 9(C) and FIG. 12(B), the magnetic sensor 28 outputs the maximum value, and in the open state shown in FIG. 12(A), the magnetic sensor 28 outputs the minimum value.

In a state during the assist controlling shown in FIG. 12(A) and FIG. 12(B), the displayed contents may be exchanged between the sub LCD monitor 34 and the main LCD monitor 32.

Accordingly, in the open state shown in FIG. 12(A), in a case that the surface where the receiving sensitivity of the antenna 24a is retained in good condition is the outer surface of the case C2, the opposite side of the outer surface of the case C2 where the receiving sensitivity of the antenna 24a retains in good condition becomes the inner surface of the case C2. Accordingly, the position of the antenna 24a is not included within the display range of the sub LCD monitor 34. Thus, the sub LCD monitor 34 displays the schematic view 38 of the inner surface of the case C2, and further displays the assist mark 36 at the position of the antenna 24a with respect to the inner surface of the case C2. Furthermore, the main LCD monitor 32 displays a character string prompting the user to confirm the sub LCD monitor 34.

In addition, in the closed state shown in FIG. 12(B), the opposite side of the outer surface of the case C2 where the receiving sensitivity of the antenna 24a is retained in good condition shall be the outer surface of the case C1 attached with the main LCD monitor 32. Accordingly, the position of the antenna 24a is within the display range of the main LCD monitor 32. Thus, the main LCD monitor 32 displays the assist mark 36 at the position of the antenna 24a with respect to the display range of the main LCD monitor 32.

Figure 13:
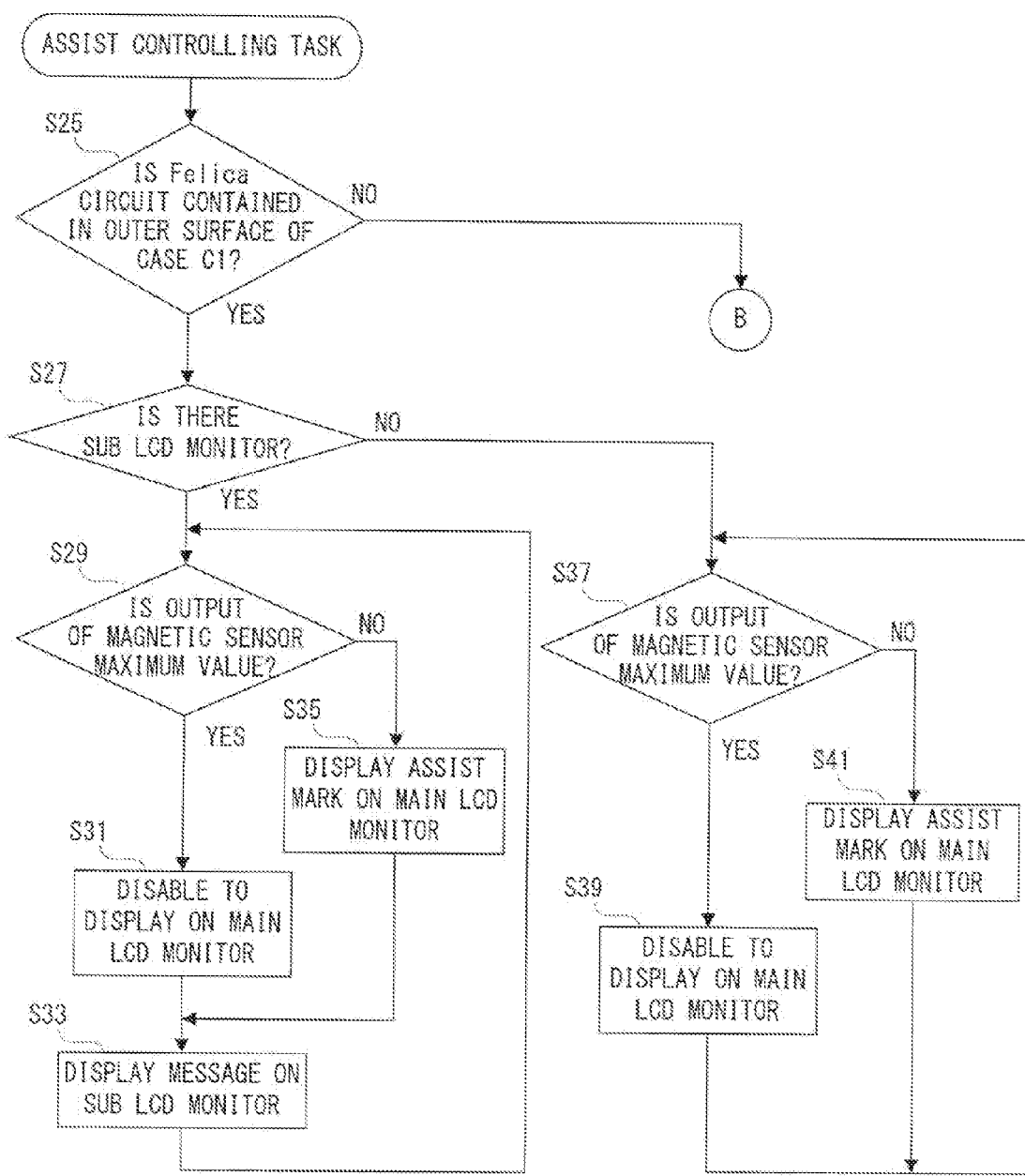
FIG. 13 is a flowchart showing a part of an operation of the CPU applied to the third embodiment.
Figure 14:
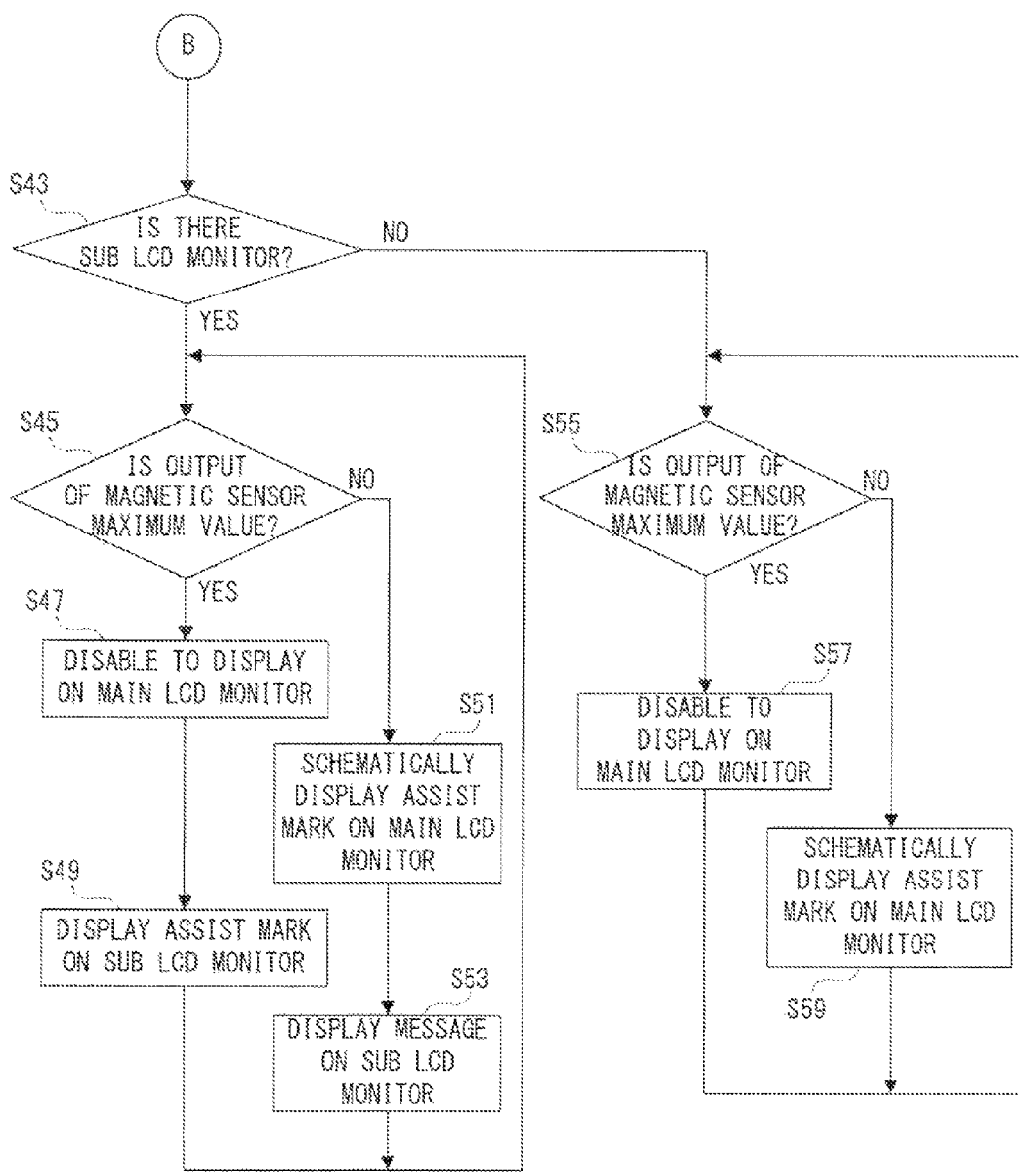
FIG. 14 is a flowchart showing another part of the operation of the CPU applied to the third embodiment.

The CPU 22 executes in parallel a plurality of tasks including the Felica mode controlling task shown in FIG. 4 and the assist controlling task shown in FIG. 13 and FIG. 14. Here, the control program corresponding to these tasks is stored in the flash memory 20, and the image data of the assist mark 36 and the schematic view 38 which are shown in FIG. 3(A)-FIG. 3(C) and the letter data of the character string shown in FIG. 11 are stored in the flash memory 20, and read from the flash memory 20 according to the processing in the assist controlling task.

The processing of the Felica mode controlling task in the third embodiment is the same as the first embodiment, and thus omitted. Referring to FIG. 13 and FIG. 14, the processing of the assist controlling task is explained. In a step S25, it is determined whether or not the Felica circuit 24 is contained in the case C1. The result of the determination is "YES" with respect to the states in FIG. 8(A)-FIG. 8(C) and FIG. 10, and is "NO" with respect to the states in FIG. 9(A)-FIG. 9(C), FIG. 10 and FIG. 12(A)-FIG. 12(B). FIG. 10 is included in both of the determinations "YES" and "NO".

If "YES" in the step S25, the process proceeds to a step S27 to determine whether or not there is the sub LCD monitor 34.

The result of the determination indicates "YES" with respect to the states shown in FIG. 8(B), FIG. 8(C) and FIG. 10, and indicates "NO" with respect to the states shown in FIG. 8(A) and FIG. 10. Here, FIG. 10 is included both of the determinations of "YES" and "NO".

If "YES" in the step S27, the process proceeds to a step S29 to determine whether or not the output value of the magnetic sensor 28 is the maximum value. If "YES" here, the closed state shown in FIG. 8(B) or FIG. 8(C) is determined, and the process proceeds to a step S31. Then, it is determined that it is impossible to display the assist mark 36 on the main LCD monitor 32 in the closed state. If "NO" in the step S29, the open state shown in FIG. 10 is determined, so that the process proceeds to a step S35. Then, the assist mark 36 is displayed on the main LCD monitor 32 at the position of the antenna 24a with respect to the main LCD monitor 32.

In addition, after completion of the processing in the step S31 or the step S35, the process proceeds to a step S33 to make the sub LCD monitor 34 display a character string prompting the user to confirm the main LCD monitor 32. Then, after completion of the processing in the step S33, the process returns to the step S29 in order to determine again whether or not the output of the magnetic sensor 28 is the maximum value.

Furthermore, if "NO" in the step S27, the process proceeds to a step S37 to determine whether or not the output value of the magnetic sensor 28 is the maximum value. If "YES" here, the closed state shown in FIG. 8(A) is determined, and the process proceeds to a step S39. Then, it is determined that it is impossible to display the assist mark 36 on the main LCD monitor 32 in the closed state. If "NO" in the step S37, the open state shown in FIG. 10 is determined, and therefore, the process proceeds to a step S41. Then, the assist mark 36 is displayed on the main LCD monitor 32 at the position of the antenna 24a with respect to the main LCD monitor 32.

In addition, after completion of the processing in the step S39 or the step S41, the process returns to the step S37 in order to determine again whether or not the output of the magnetic sensor 28 is the maximum value.

Furthermore, If "NO" in the step S25, the CPU 22 proceeds to a step S43 to determine whether or not there is the sub LCD monitor 34. The determination result indicates "YES" with respect to the states shown in FIG. 9(B), FIG. 9(C), FIG. 10 and FIG. 12(A)-FIG. 12(B), and indicates "NO" with respect to the states shown in FIG. 9(A) and FIG. 10. Here, FIG. 10 is included in both of the determinations of "YES" and "NO".

If "YES" in the step S43, the process proceeds to a step S45 to determine whether or not the output value of the magnetic sensor 28 is the maximum value. If "YES" here, the closed state shown in FIG. 9(B)-FIG. 9(C) and FIG. 12(B) is determined, so that the process proceeds to a step S47. Then, it is determined that it is impossible to display the assist mark 36 on the main LCD monitor 32 and the sub LCD monitor 34 in the closed state. In a following step S49, in the states shown in FIG. 9(B)-FIG. 9(C), on the sub LCD monitor 34, the assist mark 36 is displayed at the position of the antenna 24a with respect to the sub LCD monitor 34. In the state shown in FIG. 12(B), the assist mark 36 is displayed on the main LCD monitor 32 at the position of the antenna 24a with respect to the main LCD monitor 32.

If "NO" in the step S45, the open state shown in FIG. 10 and FIG. 12(A) is determined, so that the process proceeds to a step S51. Then, in the state shown in FIG. 10, the schematic view 38 of the inner surface of the case C2 is displayed on the main LCD monitor 32, and the assist mark 36 is displayed at the position of the antenna 24a with respect to the inner surface of the case C2. In the state shown in FIG. 12(A), the schematic view 38 of the inner surface of the case C2 is displayed on the sub LCD monitor 34, and the assist mark 36 is further displayed at the position of the antenna 24a with respect to the inner surface of the case C2.

Successively, in a step S53, in the state shown in FIG. 10, a character string prompting the user to confirm the main LCD monitor 32 is displayed on the sub LCD monitor 34. In the state shown in FIG. 12(A), a character string prompting the user to confirm the sub LCD monitor 34 is displayed on the main LCD monitor 32.

In addition, after completion of the processing in the step S49 or the step S53, the process returns to the step S45 in order to determine again whether or not the output of the magnetic sensor 28 is the maximum value.

Furthermore, if "NO" in the step S43, the process proceeds to a step S55 to determine whether or not the output value of the magnetic sensor 28 is the maximum value. If "YES" here, the closed state shown in FIG. 9(A) is determined, and the process proceeds to a step S57. Then, it is determined that it is impossible to display the assist mark 36 on the main LCD monitor 32 in the closed state. If "NO" in the step S55, the open state shown in FIG. 10 is determined, and the process proceeds to a step S59. Then, the schematic view 38 of the inner surface of the case C2 is displayed on the main LCD monitor 32, and the assist mark 36 is displayed at the position of the antenna 24a with respect to the inner surface of the case C2. In addition, after completion of the processing in the step S57 or the step S59, the process returns to the step S55 in order to determine whether or not the output of the magnetic sensor 28 is the maximum value.

It should be noted that in the third embodiment, the hinge mechanism H1 or hinge mechanism H2 may be formed at the other end in the longitudinal direction of the inner surface of the case C2, and the case C1 may be coupled with the hinge mechanism H1 or the hinge mechanism H2 on the side surface at the other end in the longitudinal direction.

<Fourth Embodiment>

In a fourth embodiment, the rotation mechanism K and the mechanism H2 are simultaneously adopted in place of the sliding mechanism SL. Also, the fourth embodiment is the same in the processing of the Felica mode controlling task in FIG. 4 used for explanation of the first embodiment, the configuration of the mobile communication terminal 10 in FIG. 7 used for explanation of the third embodiment, and the display example in FIG. 11, and therefore, in the explanation of the fourth embodiment, the drawings and the description therefor are omitted.

Referring to FIG. 9(A)-FIG. 9(C), FIG. 10, FIG. 12(A)-FIG. 12(B) and FIG. 15(A)-FIG. 15(C), in FIG. 9(A)-FIG. 9(C) and FIG. 10, assuming that the hinge mechanism H2 is adopted in place of the hinge mechanism H1, and the rotating mechanism K is further provided. Then, in FIG. 12(A)-FIG. 12(B), assuming that the rotating mechanism K is further provided. The Felica circuit 24 is contained in the case C2 such that the antenna 24a retains a good receiving sensitivity on the outer surface of the case C2.

The key input device 26 is attached to the case C2 such that the operation keys are exposed from the inner surface of the case C2. The magnetic sensor 28 is contained in the case C2. The magnet 30 is contained in the case C1 so as to be the closest to the magnetic sensor 28 in the states in FIG. 9(A)-FIG. 9(C). The main LCD monitor 32 is attached to the case C1 such that the monitor screen is exposed from the inner surface of the case C1.

The sub LCD monitor 34 is attached to the case C1 such that the monitor screen is exposed from the outer surface opposite to the inner surface to which the main LCD monitor 32 of the case C1 is attached. Furthermore, in FIG. 9(A) and FIG. 15(A), the sub LCD monitor 34 is not attached to the case C1.

The rotating mechanism K and the hinge mechanism H1 are configured to be coupled with each other at one end in a longitudinal direction of the inner surface of the case C2. Furthermore, the hinge mechanism H2 is coupled with the rotating mechanism K such that an axis AX1 crosses with an intersection point of an axis AX 2 and an axis AX 3.

The case C1 is coupled with the hinge mechanism H2 on a side surface at one end in the longitudinal direction. Furthermore, the rotating mechanism K and the hinge mechanism H2 rotates the case C1 in a range of from 0 degrees-360 degrees with reference to the axis AX1 vertical to the inner surface of the case C2 in a state that the case C1 is stacked on the case C2, further moves the case C1 with reference to the axis AX2 in parallel with the short side of the inner surface of the case C2, and rotates the case C1 with reference the axis AX3 being vertical to the axis AX2 and being in parallel with the inner surface of the case C1. That is, the first case and the second case are opened and closed by a rotation with reference to the axis AX2. In addition, by a rotation with reference to the axis AX3, the direction of the face of the first case is reversed. Thus, in the fourth embodiment, in addition to the states in FIG. 9(A)-FIG. 9(C), FIG. 10, FIG. 12(A)-FIG. 12(B), the states shown in FIG. 15(A)-FIG. 15(C) can be positioned.

The magnetic sensor 28 outputs 255 being a maximum value in states shown in FIG. 9(A)-FIG. 9(C) and FIG. 12(B), and outputs 0 being a minimum value in states shown in FIG. 10 and FIG. 12(A). That is, in the closed state shown in FIG. 9(A)-FIG. 9(C) and FIG. 12(B), the magnetic sensor 28 outputs the maximum value, and in the open state shown in FIG. 12(A), the magnetic sensor 28 outputs the minimum value. In addition, in the states shown in FIG. 10, and FIG. 15(A)-FIG. 15(C), the magnetic sensor 28 does not output the minimum value, but this is regarded as an open state.

Then, when a rotation is made from FIG. 9(B) and FIG. 9(C) to FIG. 12(A), the output value of the magnetic sensor 28 becomes small in correspondence with the rotation amount. A threshold value in switching processing between the open state and the closed state shall be an output value of the magnetic force sensor 28 when rotating is made to a limit position where the position of Felica circuit 24 is within the display range of the sub LCD monitor 34.

Furthermore, in the states shown in FIG. 9(A)-FIG. 9(C), FIG. 10 and FIG. 12(A)-FIG. 12(B), similar to the third embodiment, the assist mark 36 shown in FIG. 3(A), the schematic view 38 shown in FIG. 3(B) and the character string shown in FIG. 11 are displayed. In addition, in a case that the Felica circuit 24 is contained in the position shown in FIG. 9(B), in the state in FIG. 12(C) during the control of the assist, the displayed contents may be exchanged between the sub LCD monitor 34 and the main LCD monitor 32.

Referring to FIG. 15(A)-FIG. 15(C) and FIG. 3(A)-FIG. 3(B), in the fourth embodiment, the schematic view 38 schematically represents the operation keys of the key input device 26 attached to the inner surface of the case C2.

Figure 15:
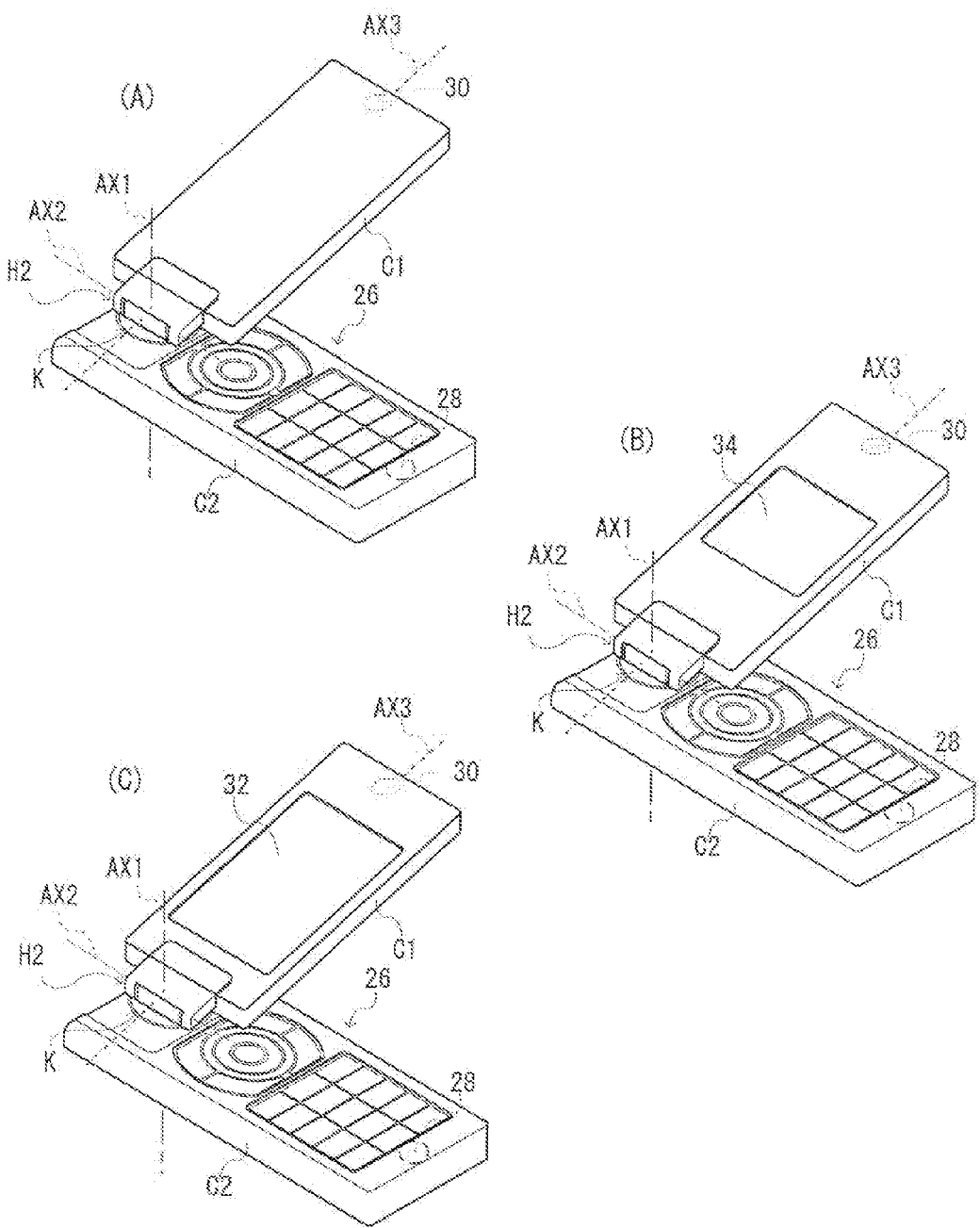
FIG. 15(A) is a perspective view showing an appearance of a fourth embodiment in a certain attitude.
FIG. 15(B) is a perspective view showing the appearance of the fourth embodiment in another attitude.
FIG. 15(C) is a perspective view showing the appearance of the fourth embodiment in a still another attitude.

In the state shown in FIG. 15(A), the opposite side of the outer surface of the case C2 where the receiving sensitivity of the antenna 24a is retained in good condition becomes the inner surface of the case C2. Accordingly, the position of the antenna 24a is not included within the display range of the main LCD monitor 32. Thus, the main LCD monitor 32 displays the schematic view 38 of the inner surface of the case C2, and further displays the assist mark 36 at the position of the antenna 24a with respect to the inner surface of the case C2.

Similar to the state shown in FIG. 15(A), in the state shown in FIG. 15(B), the opposite side of the outer surface of the case C2 where the receiving sensitivity of the antenna 24a is retained in good condition becomes the inner surface of the case C2. Accordingly, within the display range of the sub LCD monitor 34, the position of the antenna 24a is not included. Thus, the sub LCD monitor 34 displays the schematic view 38 of the inner surface of the case C2, and further displays the assist mark 36 at the at the position of the antenna 24a with respect to the inner surface of the case C2. Then, the main LCD monitor 32 displays the schematic view 38 of the inner surface of the case C2 similar to the state shown in FIG. 15(A), and further displays the assist mark 36 at the position of the antenna 24a with respect to the inner surface of the case C2.

In the open state shown in FIG. 15(C), similar to the state in FIG. 15(B), the main LCD monitor 32 and the sub LCD monitor 34 display the schematic view 38 of the inner surface of the case C2, and further displays the assist mark 36 at the position of the antenna 24a with respect to the inner surface of the case C2.

That is, on the opposite side of the inner surface of the case C2 corresponding to the schematic view 38 displayed on the main LCD monitor 32 and the sub LCD monitor 34, the antenna 24a exists. Thus, the user is only necessary to make the surface where the receiving sensitivity of the antenna 24a is retained in good condition, that is, the outer surface of the case C2 close to the reader/writer such that the position of the assist mark 36 displayed on the main LCD monitor 32 and the reader/writer are superimposed with each other.

Additionally, in a case of the closed position and a change of the output value of the magnetic sensor 28, the CPU 22 detects the change of the position of the antenna 24a with respect to the main LCD monitor 32 from the output value of the magnetic sensor 28, and moves the assist mark 36 on the basis of the detection result. For example, in a case that the value of the magnetic sensor 28 continuously changes, the position of the antenna 24a with respect to the main LCD monitor 32 similarly changes, so that the assist mark 36 is displayed on the main LCD monitor 32 like animation.

That is, in a case that a rotation is made from the state shown in FIG. 12(B) to the state shown in FIG. 10, in the closed state, the CPU 22 gradually moves the position of the assist mark 36. Then, the user is only necessary to make the surface where the receiving sensitivity of the antenna 24a is retained in good condition, that is, the bottom surface of the case C2 close to the reader/writer in correspondence with the gradually moved position of the assist mark 36 such that the position of the assist mark 36 displayed on the main LCD monitor 32 and the reader/writer are superimposed with each other.

Figure 16:
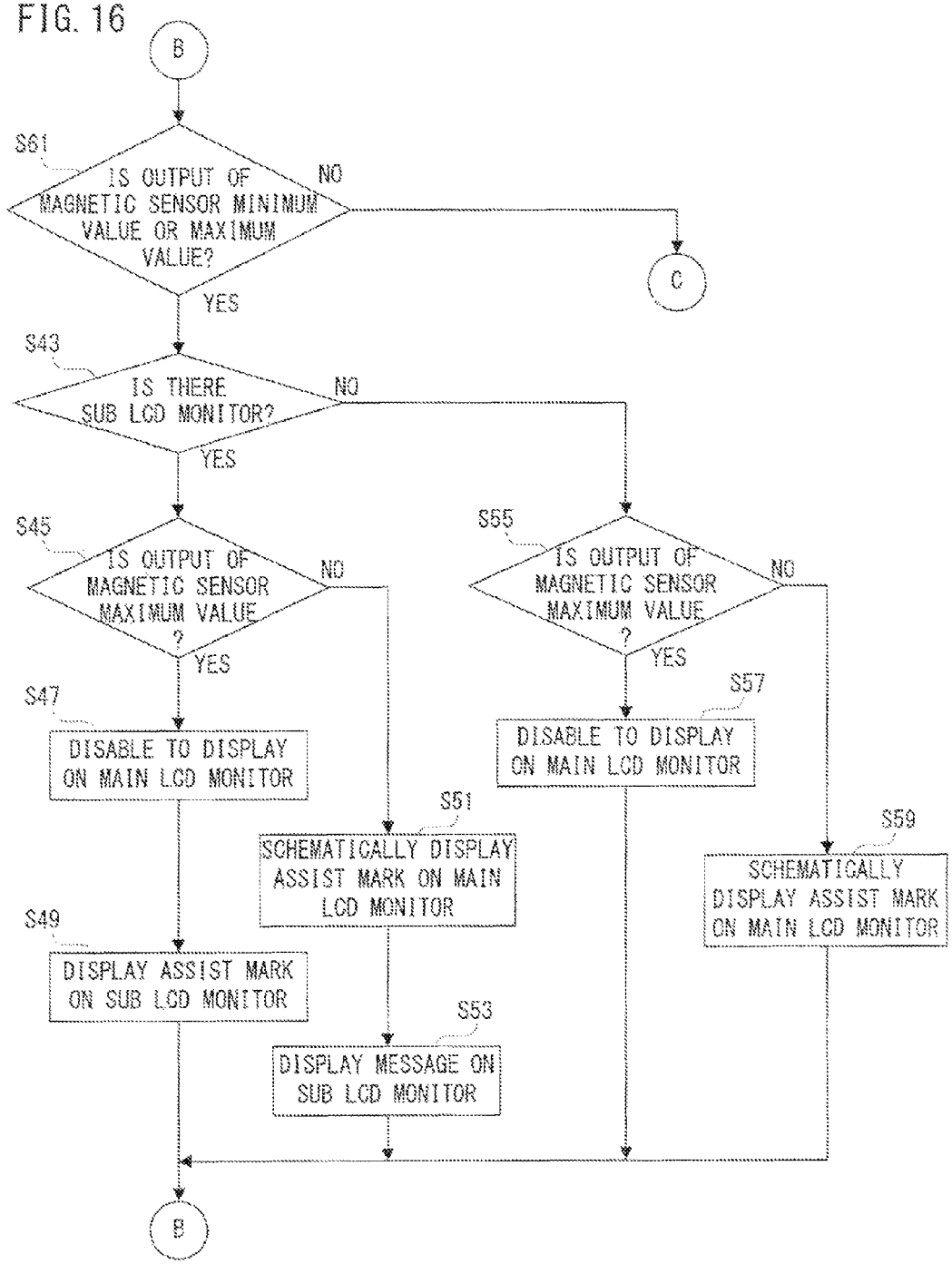
FIG. 16 is a flowchart showing a part of an operation of the CPU applied to the fourth embodiment.
Figure 17:
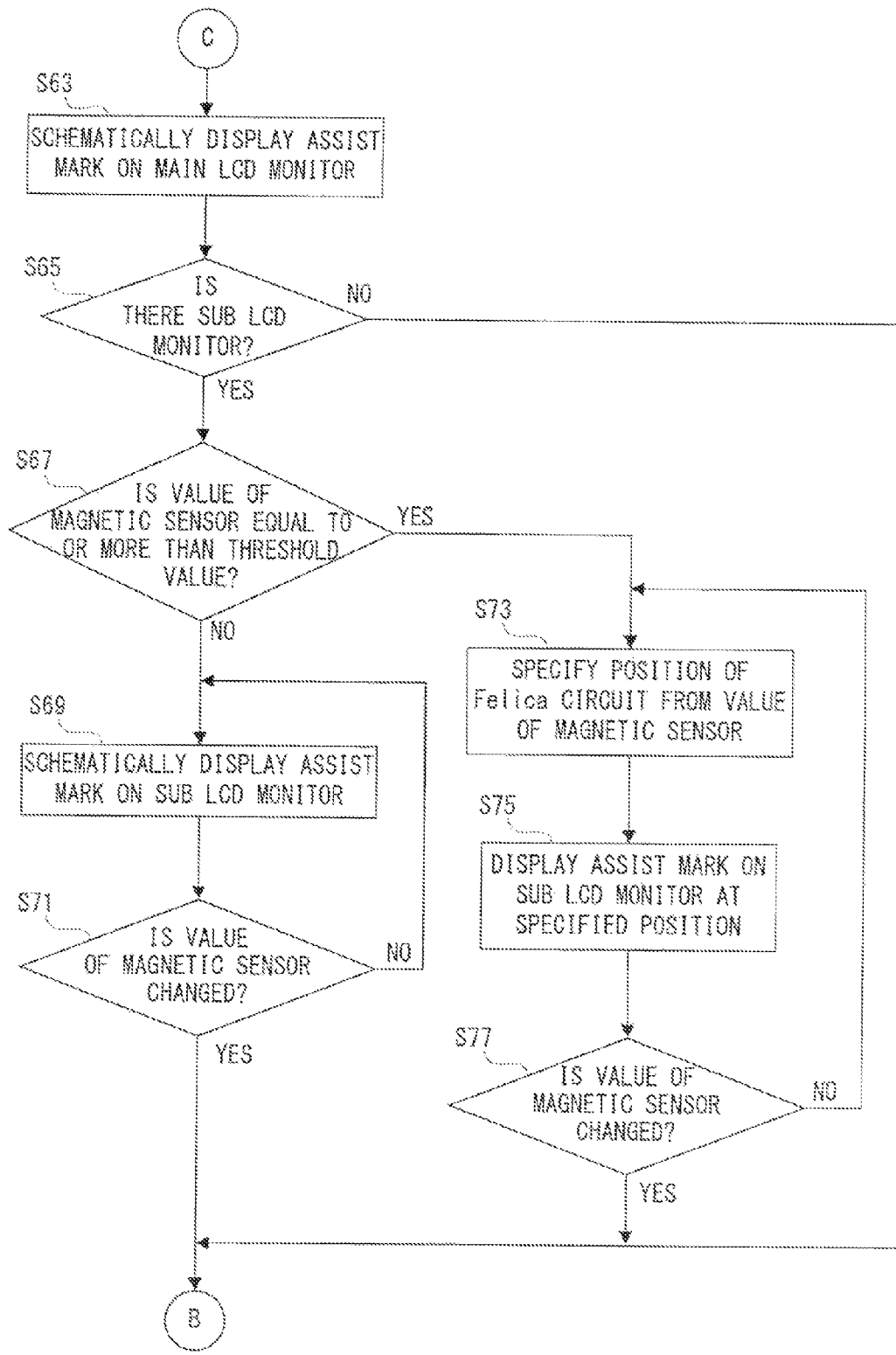
FIG. 17 is a flowchart showing another part of the operation of the CPU applied to the fourth embodiment.

The CPU 22 executes a plurality of tasks including the Felica mode controlling task shown in FIG. 4 and the assist controlling task shown in FIG. 16 and in FIG. 17 in parallel. Here, the control program corresponding to these tasks is stored in the flash memory 20, and the image data of the assist mark 36 and schematic view 38 shown in FIG. 3(A)-FIG. 3(C) and the letter data of the character string shown in FIG. 11 are stored in the flash memory 20, and read from the flash memory 20 in correspondence with the processing of the assist controlling task.

The processing of the Felica mode controlling task of the fourth embodiment is the same as that of the first embodiment, and is thus omitted.

Referring to FIG. 16 and FIG. 17, the processing of the assist controlling task is explained. In a step S61, it is determined whether or not the output value of the magnetic sensor 28 is a minimum value or a maximum value. The determination result indicates "YES" in the states shown in FIG. 9(A)-FIG. 9(C), and indicates "NO" in the states shown in FIG. 10 and FIG. 12(A)-FIG. 12(B), FIG. 15(A)-FIG. 15(C).

If "YES" in the step S61, the change of the output value of the magnetic sensor 28 is regarded as a rotation of the case C1 by the hinge mechanism H2, and the processing in steps 43-S59 is performed on the hinge mechanism H2 similar to the third embodiment. Then, after completion of the processing in the step S49 or the step S53, the process returns to the step S61. In addition, after completion of the step S57 or the step S59, the process returns to the step S61. Alternatively, if "NO" in the step S61, this is regarded as a rotation of the case C1 by the rotating mechanism K, and the process proceeds to a step S63. In the step S63, in the states shown in FIG. 15(A) and FIG. 15(B), the main LCD monitor 32 displays the schematic view 38 of the inner surface of the case C2, and further displays the assist mark 36 at the position of the antenna 24a with respect to the inner surface of the case C2. In the state shown in FIG. 15(C), the schematic view 38 of the top surface of the case C2 is displayed on the sub LCD monitor 34, and the assist mark 36 is further displayed at the position of the antenna 24a with respect to the top surface of the case C2.

In a following step S65, it is determined whether or not there is the sub LCD monitor 34. The determination result indicates "YES" in the state shown in FIG. 15(B) or FIG. 15(C), and "NO" in the state shown in FIG. 15(A). If "YES" in the step S65, the process proceeds to a step S67 to determine whether or not the output value of the magnetic sensor 28 is equal to or more than the threshold value. If "NO" here, the output value of the magnetic sensor 28 is equal to or less than the threshold value, resulting in the open state shown in FIG. 15(B) and FIG. 15(C). Then, the process proceeds to a step S69. In the state shown in FIG. 15(B), the schematic view 38 of the top surface of the case C2 is displayed on the sub LCD monitor 34, and the assist mark 36 is further displayed at the position of the antenna 24a with respect to the top surface of the case C2. In the state shown in FIG. 15(C), the schematic view 38 of the top surface of the case C2 is displayed on the main LCD monitor 32, and the assist mark 36 is further displayed at the position of the antenna 24a with respect to the top surface of the case C2.

In a following step S71, it is determined whether or not the output value of the magnetic sensor 28 changes. If "YES" here, the process returns to the step S61 in order to determine again whether or not the output value of the magnetic sensor 28 is the minimum value or the maximum value. If "NO" here, the process returns to the step S69. In the state shown in FIG. 15(B), the schematic view 38 of the top surface of the case C2 is displayed on the sub LCD monitor 34, and the assist mark 36 is further displayed at the position of the antenna 24a with respect to the top surface of the case C2. In a case of the state shown in FIG. 15(C), the schematic view 38 of the top surface of the case C2 is displayed on the main LCD monitor 32, and the assist mark 36 is continuously displayed at the position of the antenna 24a with respect to the top surface of the case C2. Furthermore, if "YES" in the step S67, the output value of the magnetic sensor 28 is equal to or more than the threshold value, resulting in the closed state. Then, the process proceeds to a step S73 to specify the position of the Felica circuit 24 with respect to the main LCD monitor 32 from the output value of the magnetic sensor 28. In a following step S75, on the basis of the position of the Felica circuit 24 specified in the step S73, the assist mark 36 is displayed at the position of the Felica circuit 24 specified in the step S73 on the main LCD monitor 32.

In a following step S77, it is determined whether or not the output value of the magnetic sensor 28 changes. If "YES" here, the process returns to the step S61 in order to determine again whether the output value of the magnetic sensor 28 is the minimum value or the maximum value. If "NO" here, the process returns to the step S73 to repeat the processing in the steps S73-S77, so that the assist mark 36 is continuously displayed at the position of the Felica circuit 24 specified in the step S73.

Additionally, in a case of the closed state, when the case C1 slides with respect to the case C2, the processing in the step S67 and steps S73-S77 are repeated. Thus, the position of the antenna 24a with respect to the main LCD monitor 32 changes as well, so that the assist mark 36 is displayed on the sub LCD monitor 34 like animation.

It should be noted that in the fourth embodiment, as in Japanese Patent Application Laid-Open No. 2001-156893 or Japanese Patent Application Laid-Open No. 2003-338866, the main LCD monitor 32 may be moved with respect to the main surface of the case C1. Furthermore, in place of the hinge mechanism H2, the hinge mechanism H1 may be used.

<Fifth Embodiment>

Figure 18:
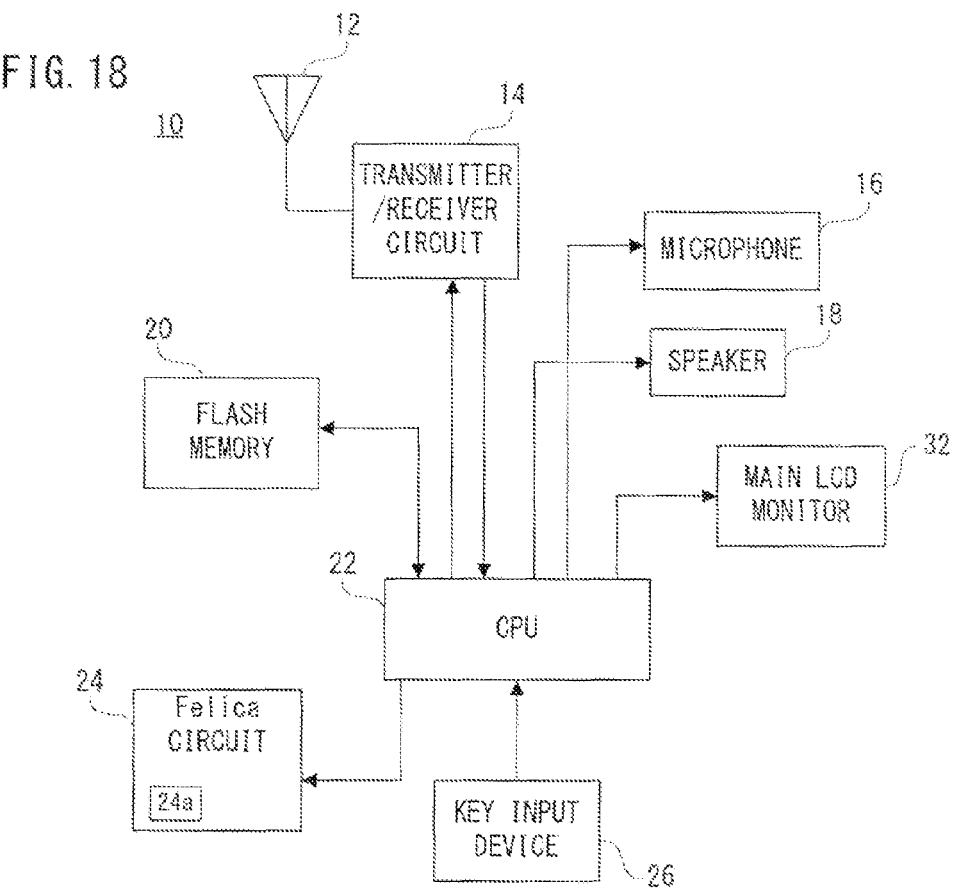
FIG. 18 is a block diagram showing a fifth embodiment of the present invention.

In a fifth embodiment, a straight mobile communication terminal 10 needs not to adopt the magnetic sensor 28 in the configuration shown in FIG. 18. Furthermore, the fifth embodiment is the same in the processing of the Felica mode controlling task in FIG. 4 used for the explanation of the first embodiment, and therefore, in the explanation of the fifth embodiment, the explanation of FIG. 4 is omitted.

Referring to FIG. 18, the mobile communication terminal 10 in the fifth embodiment is configured to remove the magnetic sensor 28 and the magnet 30 in the mobile communication terminal 10 from the first embodiment.

Referring to FIG. 19(A)-FIG. 19(C), the mobile communication terminal 10 of the fifth embodiment configured with only the case C1 contains the Felica circuit 24 at a position shown in FIG. 19(B) or FIG. 19(C). The key input device 26 is attached to the case C1 such that the operation keys are exposed from a main surface of the case C1. The main LCD monitor 32 is attached to the case C1 such that the monitor screen is exposed from the main surface of the case C1. The Felica circuit 24 is contained in the case C1 such that the antenna 24a retains good receiving sensitivity on the other surface of the case C1.

Referring to FIG. 19(A)-FIG. 19(C) and FIG. 3(A)-FIG. 3(B), the schematic view 38 schematically represents the operation keys of the key input device 26 attached to the main surface of the case C1.

In the states shown in FIG. 19(A) and FIG. 19(B), the opposite side of the case C1 where the receiving sensitivity of the antenna 24a retains in good condition becomes the main surface of the case C1 attached with the main LCD monitor 32.

Accordingly, the position of the antenna 24a is included within the display range of the main LCD monitor 32. Thus, the main LCD monitor 32 displays the assist mark 36 at the position of the antenna 24a with respect to the display range of the main LCD monitor 32.

That is, on the opposite side of the assist mark 36 displayed on the main LCD monitor 32, the antenna 24a exists. Then, the user is only necessary to make the surface where the receiving sensitivity of the antenna 24a is retained in good condition, that is, the other surface of the case C1 close to the reader/writer such that the position of the assist mark 36 displayed on the main LCD monitor 32 and the reader/writer are superimposed with each other.

In the state shown in FIG. 19(A) and FIG. 19(C), the opposite side of the other surface of the case C1 where the receiving sensitivity of the antenna 24a is retained in good condition becomes the main surface of the case C1. However, on the display range of the main LCD monitor 32, the position of the antenna 24a is not included. Thus, the main LCD monitor 32 displays the schematic view 38 of the main surface of the case C1, and further displays the assist mark 36 at the position of the antenna 24a with respect to the main surface of the case C1.

That is, on the opposite side of the main surface of the case C1 corresponding to the schematic view 38 displayed on the main LCD monitor 32, the antenna 24a exists. Thus, the user is only necessary to make the surface where the receiving sensitivity of the antenna 24a is retained in good condition, that is, the other surface of the case C1 close to the reader/writer such that the position of the assist mark 36 and the reader/writer are superimposed with each other on the main surface of the case C1 corresponding to the schematic view 38 displayed on the main LCD monitor 32.

Figure 20:
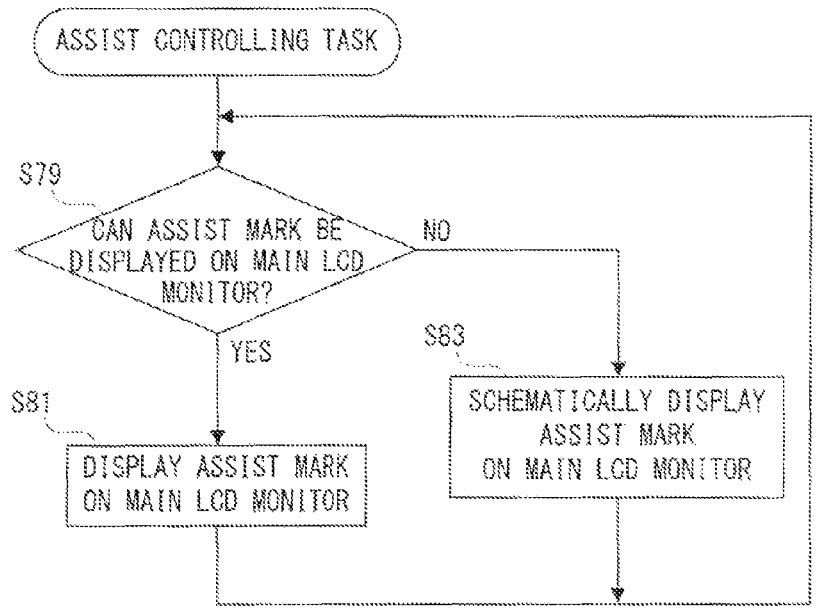
FIG. 20 is a flowchart showing a part of an operation of the CPU applied to the fifth embodiment.

The CPU 22 executes in parallel a plurality of tasks including the Felica mode controlling task shown in FIG. 4 and an assist controlling task shown in FIG. 20. The control program corresponding to these tasks is stored in the flash memory 20, and the image data of the assist mark 36 and the schematic view 38 shown in FIG. 3(A) and FIG. 3(B) are stored in the flash memory 20 and read from the flash memory 20 in correspondence with the processing of the assist controlling task.

The processing of the Felica mode controlling task in the fifth embodiment is the same as that of the first embodiment, and therefore, is omitted.

Referring to FIG. 20, the processing of the assist controlling task is explained. In a step S79, it is determined whether or not the assist mark 36 can be displayed on the main LCD monitor 32. If "YES" here, this means the states shown in FIG. 19(A) and FIG. 19(B), and therefore, the process proceeds to a step S81. Then, the assist mark 36 is displayed on the main LCD monitor 32 at the position of the antenna 24a with respect to the main LCD monitor 32.

Furthermore, if "NO" in the step S79, this means the states shown in FIG. 19(A) and FIG. 19(C), and therefore, the process proceeds to a step S83. Then, the schematic view 38 of the main surface of the case C1 is displayed on the main LCD monitor 32, and the assist mark 36 is further displayed at the position of the antenna 24a with respect to the main surface of the case C1.

After completion of the processing in the step S81 or the step S83, the process returns to the step S79 in order to determine whether or not the assist mark 36 can be displayed on the main LCD monitor 32 again.

It should be noted in the fifth embodiment, a flip-typed mobile communication terminal 10 which hides the key input device 26 under a cover may be used.

It should be noted that in the first embodiment-fifth embodiment, the magnetic sensor 28 and the magnet 30 are adopted for switching processing between the open state and the closed state, but a contactless switch utilizing infrared rays, etc. and a contact switch utilizing a mechanical switch may be used.

Furthermore, a movement amount sensor for detecting an amount of movement of the first case with respect to the second case may be further provided to the processing of detecting changes of the position of the Felica circuit 24 with respect to the main LCD monitor 32.

Additionally, the schematic view 38 is the top surface of the case C2, but may be changed depending on the face where the Felica circuit 24 is contained.

Moreover, as the communication system of the mobile communication terminal 10, it is needless to say that a PHS system, a TDMA system, and a W-CDMA system may be adopted other than the CDMA system.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A communication terminal comprising:
   a case;
   a display attached to said case;
   an antenna for Near Field Communication contained in said case; and
   a displayer that displays a position of said antenna on said display, wherein said displayer displays a first assist mark representing the position of said antenna with respect to said display in a case that the position of said antenna is included within a display range of said display;
   a determiner for determining whether or not the position of said antenna is included within a display range of said display, wherein
   said displayer includes a first displayer that displays the first assist mark representing the position of said antenna with respect to said display in a case that the determination result by said determiner is affirmative, wherein
   said case includes said first case and a second case, and further comprising
   a coupler that couples said first case and said second case such that a state of said first case with respect to said second case can be shifted,
   a sensor that detects a state of said first case with respect to said second case and providing an output, and
   a position specifier that specifies a position of said antenna with respect to said case on the basis of an output from said sensor, wherein
   said determiner performs a determination on the basis of the position specified by said position specifier.

2. A communication terminal according to claim 1, wherein
   said position specifier repeatedly executes position specifying processing, and
   said first displayer moves said first assist mark on the basis of a change of the position specified by said position specifier.

3. A communication terminal according to claim 1, wherein
   said display includes a first display,
   said first display is attached to one main surface of said first case, and
   said antenna is contained in said first case or said second case.

4. A communication terminal according to claim 3, wherein said first case includes an other main surface,
   said display further includes a second display, and
   said second display is attached to the other main surface of said first case.

5. A communication terminal according to claim 4, further comprising a character string displayer that displays on said second display a character string to prompt a user to confirm said first display.

6. A communication terminal according to claim 1, further including a first axis vertical to a main surface of said second case, and wherein
    said coupler includes a rotating mechanism of moving said first case with reference to the first axis vertical to a main surface of said second case in a state that said first case is stacked on said second case.

7. A communication terminal according to claim 1, wherein said coupler includes a sliding mechanism of sliding said first case in a state that said first case is stacked on said second case.

8. A communication terminal according to claim 1, further including a hinge shaft, and wherein
    said coupler includes a hinge mechanism of moving said first case with reference to the hinge shaft in a state that said first case is stacked on said second case.

9. A communication terminal according to claim 8, wherein said hinge shaft is a first hinge shaft and said second case includes a main surface with a short side, said hinge mechanism includes a first hinge mechanism of moving said first case with reference to the first hinge shaft being in parallel with the short side of the main surface of said second case.

10. A communication terminal according to claim 9, further including a second hinge shaft, and said first case includes a face and a long side, and
    said hinge mechanism further includes a second hinge mechanism of reversing a direction of the face of said first case by a rotation with reference to the second hinge shaft being vertical to said first hinge shaft and being in parallel with the long side of said first case.

11. A communication terminal according to claim 1, wherein said displayer further includes a second displayer that displays a second assist mark representing the position of said antenna with respect to said case on said display in a case that the determination result by said determiner is negative.

* * * * *